(12) United States Patent
Smith et al.

(10) Patent No.: US 8,990,430 B2
(45) Date of Patent: Mar. 24, 2015

(54) INTERFACE BUNDLES IN VIRTUAL NETWORK DEVICES

(75) Inventors: Michael R. Smith, Morgan Hill, CA (US); Jeffrey Y M Wang, Saratoga, CA (US); Ali Golshan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1306 days.

(21) Appl. No.: 10/782,314

(22) Filed: Feb. 19, 2004

(65) Prior Publication Data

US 2005/0198371 A1    Sep. 8, 2005

(51) Int. Cl.
| | |
|---|---|
| *G06F 15/16* | (2006.01) |
| *H04L 12/933* | (2013.01) |
| *H04L 12/751* | (2013.01) |
| *H04L 12/775* | (2013.01) |
| *H04L 12/713* | (2013.01) |
| *H04L 12/931* | (2013.01) |

(52) U.S. Cl.
CPC ............ *H04L 49/1553* (2013.01); *H04L 45/02* (2013.01); *H04L 45/583* (2013.01); *H04L 45/586* (2013.01); *H04L 49/354* (2013.01)
USPC ....................................................... 709/249

(58) Field of Classification Search
USPC .......................................... 370/401; 709/249
See application file for complete search history.

(56) References Cited

U.S. PATENT DOCUMENTS

| | | | |
|---|---|---|---|
| 4,387,371 A | 6/1983 | Beker et al. ............. 340/825.52 |
| 5,058,110 A | 10/1991 | Beach et al. ................ 370/464 |
| 5,311,593 A | 5/1994 | Carmi | |
| 5,371,852 A | 12/1994 | Attanasio et al. ............. 709/245 |
| 5,394,402 A | 2/1995 | Ross | |
| 5,473,599 A | 12/1995 | Li et al. ............................ 370/16 |
| 5,517,260 A | 5/1996 | Glady et al. | |
| 5,615,340 A | 3/1997 | Dai et al. | |
| 5,680,589 A | 10/1997 | Klingman | |
| 5,825,772 A | 10/1998 | Dobbins et al. ................ 370/396 |
| 5,835,725 A | 11/1998 | Chiang et al. | |
| 5,872,783 A | 2/1999 | Chin ........................ 370/395.32 |
| 5,959,968 A | 9/1999 | Chin et al. .................... 370/216 |
| 5,959,972 A | 9/1999 | Hamami ....................... 370/228 |
| 5,959,989 A | 9/1999 | Gleeson et al. ............... 370/390 |
| 5,978,852 A | 11/1999 | Myrick et al. ................. 709/238 |
| 5,999,531 A | 12/1999 | Ferolito et al. | |

(Continued)

FOREIGN PATENT DOCUMENTS

| | | | | |
|---|---|---|---|---|
| CN | 1407762 A | 4/2003 | ............. H04L 12/28 |
| EP | 1 035 685 | 9/2000 | ........................ 12/18 |

(Continued)

OTHER PUBLICATIONS

W. Richard Stevens, TCP/IP Illustrated, vol. 1: The Protocols, Dec. 31, 1993. p. 1-6.*

(Continued)

*Primary Examiner* — Ryan Jakovac
(74) *Attorney, Agent, or Firm* — Campbell Stephenson LLP

(57) ABSTRACT

A virtual network device includes several different virtual network device sub-units, which collectively operate as a single logical network device. An interface bundle includes interfaces in more than one of the different virtual network device sub-units included in the virtual network device. The interface bundle is coupled to a virtual link bundle, which connects the virtual network device to another device. The interface bundle is managed as a single logical interface.

45 Claims, 13 Drawing Sheets

(56) References Cited

U.S. PATENT DOCUMENTS

| | | | |
|---|---|---|---|
| 6,032,194 A | 2/2000 | Gai et al. | 709/239 |
| 6,064,671 A | 5/2000 | Killian | 370/389 |
| 6,085,238 A | 7/2000 | Yuasa et al. | 709/223 |
| 6,108,300 A | 8/2000 | Coile et al. | 370/217 |
| 6,163,543 A | 12/2000 | Chin et al. | 370/400 |
| 6,181,681 B1 | 1/2001 | Hiscock et al. | 370/279 |
| 6,181,699 B1 | 1/2001 | Crinion et al. | 370/392 |
| 6,195,351 B1 | 2/2001 | Hiscock et al. | 370/389 |
| 6,202,114 B1 | 3/2001 | Duff et al. | 710/311 |
| 6,222,820 B1 | 4/2001 | Hamami | 370/218 |
| 6,229,787 B1 | 5/2001 | Byrne | 370/218 |
| 6,236,659 B1 | 5/2001 | Pascoe | 370/404 |
| 6,243,360 B1 | 6/2001 | Basilico | 370/231 |
| 6,266,335 B1 | 7/2001 | Bhaskaran | |
| 6,275,953 B1 | 8/2001 | Vahalia et al. | 714/11 |
| 6,285,656 B1 | 9/2001 | Chaganty et al. | |
| 6,298,061 B1 | 10/2001 | Chin et al. | 370/400 |
| 6,308,218 B1 | 10/2001 | Vasa | |
| 6,308,220 B1 | 10/2001 | Mathur | |
| 6,377,992 B1 | 4/2002 | Plaza Fernandez et al. | 709/227 |
| 6,388,995 B1 | 5/2002 | Gai et al. | 370/256 |
| 6,400,715 B1 | 6/2002 | Beaudoin et al. | |
| 6,421,787 B1 | 7/2002 | Slaughter et al. | 714/4 |
| 6,460,088 B1 | 10/2002 | Merchant | 709/236 |
| 6,487,591 B1 | 11/2002 | Budhraja et al. | 709/223 |
| 6,519,231 B1 | 2/2003 | Ding et al. | 370/256 |
| 6,535,490 B1 | 3/2003 | Jain | 370/256 |
| 6,535,491 B2 | 3/2003 | Gai et al. | 370/256 |
| 6,567,403 B1 | 5/2003 | Congdon et al. | 370/389 |
| 6,570,845 B1 | 5/2003 | Blanc et al. | 370/218 |
| 6,657,973 B1 | 12/2003 | Arima | 370/254 |
| 6,658,016 B1 | 12/2003 | Dai et al. | 370/424 |
| 6,674,713 B1 | 1/2004 | Berg et al. | 370/217 |
| 6,678,241 B1 | 1/2004 | Gai et al. | 370/216 |
| 6,687,758 B2 | 2/2004 | Craft et al. | |
| 6,690,668 B1 | 2/2004 | Szczepanek et al. | 370/392 |
| 6,697,339 B1 | 2/2004 | Jain | 370/256 |
| 6,728,780 B1 | 4/2004 | Hebert | 709/239 |
| 6,735,198 B1 | 5/2004 | Edsall et al. | 370/389 |
| 6,735,205 B1* | 5/2004 | Mankude et al. | 370/395.32 |
| 6,738,345 B1 | 5/2004 | Williamson | 370/217 |
| 6,760,776 B1 | 7/2004 | Gallo et al. | 709/238 |
| 6,804,721 B2 | 10/2004 | Wils et al. | 709/230 |
| 6,810,421 B1 | 10/2004 | Ishizaki et al. | 709/226 |
| 6,816,467 B1 | 11/2004 | Muller et al. | 370/256 |
| 6,856,591 B1 | 2/2005 | Ma et al. | 370/216 |
| 6,915,340 B2 | 7/2005 | Tanaka | |
| 6,938,095 B2 | 8/2005 | Basturk et al. | 709/238 |
| 6,941,487 B1 | 9/2005 | Balakrishnan et al. | |
| 6,956,858 B2 | 10/2005 | Hariguchi et al. | |
| 6,980,534 B1 | 12/2005 | Nee et al. | 370/329 |
| 6,981,174 B1 | 12/2005 | Hanning | |
| 7,042,855 B1 | 5/2006 | Gilchrist et al. | 370/328 |
| 7,050,433 B2 | 5/2006 | Ando et al. | |
| 7,061,858 B1 | 6/2006 | Di Benedetto et al. | 370/219 |
| 7,061,875 B1 | 6/2006 | Portolani et al. | 370/256 |
| 7,079,533 B1 | 7/2006 | Erimli et al. | |
| 7,126,923 B1 | 10/2006 | Yang et al. | 370/256 |
| 7,127,633 B1 | 10/2006 | Olson et al. | 714/4 |
| 7,130,305 B2 | 10/2006 | Kuukankorpi et al. | 370/392 |
| 7,152,178 B1 | 12/2006 | Vook et al. | |
| 7,178,052 B2 | 2/2007 | Hebbar et al. | 714/4 |
| 7,188,189 B2 | 3/2007 | Karol et al. | |
| 7,251,217 B2 | 7/2007 | Wong et al. | 370/232 |
| 7,286,853 B2 | 10/2007 | Meier | 455/560 |
| 7,502,865 B2 | 3/2009 | Seto | |
| 7,636,369 B2 | 12/2009 | Wong | |
| 7,639,605 B2 | 12/2009 | Narayanan et al. | |
| 7,668,123 B1 | 2/2010 | Scott et al. | |
| 7,672,228 B1 | 3/2010 | Senevirathne et al. | 370/219 |
| 7,818,628 B1 | 10/2010 | Bishara | |
| 7,822,025 B1 | 10/2010 | Joly | |
| 7,869,803 B2 | 1/2011 | Corson et al. | |
| 8,005,981 B2 | 8/2011 | Tuck et al. | |
| 8,094,581 B2 | 1/2012 | Bahls et al. | |
| 2001/0014097 A1* | 8/2001 | Beck et al. | 370/401 |
| 2002/0016874 A1 | 2/2002 | Watanuki et al. | |
| 2002/0018489 A1 | 2/2002 | Ambe et al. | 370/401 |
| 2002/0073338 A1 | 6/2002 | Burrows et al. | 726/13 |
| 2002/0080720 A1 | 6/2002 | Pegrum et al. | 370/236 |
| 2002/0087716 A1 | 7/2002 | Mustafa | 709/236 |
| 2002/0089978 A1 | 7/2002 | Wang et al. | 370/445 |
| 2002/0091755 A1 | 7/2002 | Narin | 709/203 |
| 2002/0103921 A1 | 8/2002 | Nair et al. | 709/232 |
| 2002/0110148 A1 | 8/2002 | Hickman et al. | 370/475 |
| 2002/0126671 A1 | 9/2002 | Ellis et al. | 370/390 |
| 2002/0146008 A1 | 10/2002 | Kaplan | 370/390 |
| 2002/0152320 A1 | 10/2002 | Lau | |
| 2002/0156612 A1 | 10/2002 | Schulter et al. | 703/23 |
| 2002/0165981 A1 | 11/2002 | Basturk et al. | 709/242 |
| 2002/0176450 A1 | 11/2002 | Kong et al. | 370/401 |
| 2002/0186654 A1 | 12/2002 | Tornar | 370/216 |
| 2002/0188711 A1 | 12/2002 | Meyer et al. | 709/224 |
| 2002/0196802 A1 | 12/2002 | Sakov et al. | |
| 2003/0007489 A1 | 1/2003 | Krishnan et al. | 370/469 |
| 2003/0026248 A1 | 2/2003 | Hiroki | 370/352 |
| 2003/0037165 A1 | 2/2003 | Shinomiya | 709/238 |
| 2003/0051061 A1 | 3/2003 | Hank et al. | 709/250 |
| 2003/0061533 A1 | 3/2003 | Perloff et al. | 714/9 |
| 2003/0093557 A1 | 5/2003 | Giraud et al. | 709/239 |
| 2003/0097470 A1 | 5/2003 | Lapuh et al. | 709/239 |
| 2003/0110344 A1 | 6/2003 | Szczepanek et al. | 711/100 |
| 2003/0142680 A1 | 7/2003 | Oguchi | 370/400 |
| 2003/0152101 A1 | 8/2003 | Feng | 370/445 |
| 2003/0169734 A1 | 9/2003 | Lu et al. | 370/386 |
| 2003/0172147 A1 | 9/2003 | Chang et al. | 709/223 |
| 2003/0174709 A1 | 9/2003 | Shankar | |
| 2003/0198231 A1 | 10/2003 | Kalkunte et al. | 370/395.31 |
| 2004/0057469 A1 | 3/2004 | Nuss et al. | 370/535 |
| 2004/0066781 A1 | 4/2004 | Shankar et al. | 370/389 |
| 2004/0078621 A1 | 4/2004 | Talaugon et al. | 714/4 |
| 2004/0098501 A1 | 5/2004 | Finn | 709/236 |
| 2004/0105390 A1 | 6/2004 | Saksio | 370/245 |
| 2004/0156390 A1 | 8/2004 | Prasad et al. | 370/466 |
| 2004/0179507 A1 | 9/2004 | Batra et al. | 370/343 |
| 2004/0208116 A1 | 10/2004 | Saint Etienne et al. | 370/216 |
| 2005/0036488 A1 | 2/2005 | Kalkunte et al. | 370/389 |
| 2005/0041665 A1 | 2/2005 | Weyman et al. | 370/390 |
| 2005/0044186 A1 | 2/2005 | Petrisor | 709/219 |
| 2005/0047334 A1 | 3/2005 | Paul et al. | |
| 2005/0058063 A1 | 3/2005 | Masuyama et al. | |
| 2005/0063395 A1 | 3/2005 | Smith et al. | 370/399 |
| 2005/0083933 A1* | 4/2005 | Fine et al. | 370/390 |
| 2005/0089014 A1 | 4/2005 | Levin et al. | 370/351 |
| 2005/0091358 A1 | 4/2005 | Mehra et al. | |
| 2005/0111483 A1 | 5/2005 | Cripe et al. | 370/463 |
| 2005/0169311 A1 | 8/2005 | Millet et al. | 370/471 |
| 2005/0193114 A1 | 9/2005 | Colby et al. | 709/226 |
| 2005/0198371 A1 | 9/2005 | Smith et al. | 709/238 |
| 2005/0207436 A1 | 9/2005 | Varma | |
| 2005/0243826 A1 | 11/2005 | Smith et al. | 370/392 |
| 2005/0259646 A1 | 11/2005 | Smith et al. | 370/389 |
| 2005/0265346 A1 | 12/2005 | Ho et al. | 370/392 |
| 2006/0007859 A1 | 1/2006 | Kadambi et al. | |
| 2006/0015643 A1 | 1/2006 | Orava et al. | 709/238 |
| 2006/0062187 A1 | 3/2006 | Rune | |
| 2006/0215679 A1 | 9/2006 | Musoll et al. | 370/412 |
| 2006/0262791 A1 | 11/2006 | Kadambi et al. | |
| 2007/0154219 A1 | 7/2007 | Feinberg | |
| 2007/0159771 A1 | 7/2007 | Zhang et al. | 370/230 |
| 2007/0180266 A1 | 8/2007 | Kang et al. | 713/189 |
| 2009/0080431 A1 | 3/2009 | Rekhter | 370/392 |
| 2009/0134996 A1 | 5/2009 | White et al. | 340/538 |
| 2009/0190588 A1 | 7/2009 | Eder et al. | |

FOREIGN PATENT DOCUMENTS

| | | | | |
|---|---|---|---|---|
| EP | 1 309 135 A1 | 5/2003 | | H04L 12/56 |
| EP | 1 401 147 | 3/2004 | | 12/26 |
| GB | 2 362 538 | 5/2000 | | H04L 12/56 |
| WO | WO 00/72531 A1 | 11/2000 | | H04L 12/56 |
| WO | WO 00/78004 | 12/2000 | | H04L 29/00 |

(56) References Cited

FOREIGN PATENT DOCUMENTS

| WO | WO 02/01413 A1 | 5/2001 | ............. G06F 17/30 |
| --- | --- | --- | --- |
| WO | WO 02/18965 | 3/2002 | ......................... 31/8 |
| WO | WO 03/081451 | 10/2003 | ............. G06F 15/16 |

OTHER PUBLICATIONS

News Release: "Cisco StackWise the Bar in Stackable Switching, Introduces Catalyst 3750 Series with Cisco StackWise™ Technology;" 3 pages; http://newsroom.cisco.com/dlls/prod_041503b.html.
Cisco Catalyst 3750 Series Switches: "Cisco StackWise Technology White Paper;" 8 pages; http://www.cisco.com/en/US/products/hw/switchcs/ps5023/products_white_paper09186a00801b096a.shtml (Catalyst 3750 announced on Apr. 15, 2003).
D.T. Stott, "Layer-2 Path Discovery Using Spanning Tree MIBs", Avaya Labs Research, Avaya, Inc., Mar. 7, 2002, pp. 1-23.
International Search Report as mailed from the PCT on Mar. 18, 2005, for International Application No. PCT/US2004/034851, 2 pages.
Cisco Systems, Inc.; Copyright 1989-1997 © http://www.cisco.com/univercd/cc/td/doc/product/rtrmgt/sw_ntman/cwsimain/cwsi2/cwsiug2/vlan2/stpapp.htm "Understanding Spanning-Tree Protocol," Appendix C, pp. C-1 through C-12.
Michael Ward; "802.1S Solves Architecture Issues;" *Network World*, Aug. 4, 2003; 3 pages; http://www.n_wfusion.com/cgi-bin/mailto/x.cgi.
Nortel Networks, "Split Multi-link Trunking," http://www.nortelnetworks.com/corporate/technology/smlt/, pp. 1-2 (printed Jul. 17, 2003).
Nortel Networks, "Split Multi-link Trunking FAQs," http://www.nortelnetworks.com/corporate/technology/smlt/faq.html, pp. 1-3 (printed on Oct. 21, 2003).
Hewlett Packard, "LAN Aggregation Through Switch Meshing," XP-002284775, Jun. 1998, URL:http:/www.hp.com/rnd/library/pdf/techlib_meshing.pdf [retrieved on Jun. 16, 2004], 12 pages.
Huang, et al., "An Open Solution to Fault-Tolerant Ethernet: Design, Prototyping, and Evaluation," Performance, Computing and Communications Conference, 1999 IEEE International (Feb. 10-12, 1999), Scotsdale, Arizona, XP010323654, ISBN 0-7803-5258-0, Feb. 10, 1999, pp. 461-468.
Michael R. Smith, Jeffrey YM Wang, Ali Golshan; "Interface Bundles in Virtual Network Devices;" U.S. Appl. No. 10/782,314, filed Feb. 19, 2004; 42 pages of Specification (including claims & abstract); and 13 sheets of drawings.
Michael R. Smith, Ali Golshan, Jeffrey YM Wang, Neelima Mehta, Venkatesh Janakiraman; "Virtual Network Device;" U.S. Appl. No. 10/666,306, filed Sep. 18, 2003; 35 pages of Specification (including claims & abstract); and 8 sheets of drawings.
News Release: "Cisco Raises the Bar in Stackable Switching, Introduces Catalyst 3750 Series with Cisco StackWise™ Technology;" 3 pages; http://newsroom.cisco.com/dlls/prod_041503b.html.
Cisco Catalyst 3750 Series Switches: "Cisco StackWise Technology White Paper;" 8 pages; http://www.cisco.com/en/US/products/hw/switches/ps5023/products_white_paper09186a00801b096a.shtml (Catalyst 3750 announced on Apr. 15, 2003).
Michael R. Smith, Jeffrey YM Wang, Ali Golshan; "Port-Based Loadsharing for a Satellite Switch;" U.S. Appl. No. 10/690,348, filed Oct. 21, 2003; 47 pages of Specification (including claims & abstract); and 11 sheets of drawings.
News Release: "Cisco Raises the Bar in Stackable Switching, Introduces Catalyst 3750 Series with StackWise™ Technology;" 3 pages; http://newsroom.cisco.com/dlls/prod_041503b.html.
Cisco Catalyst 3750 Series Switches: "Cisco StackWise Technology White Paper;" 8 pages; http://www.cisco.com/en/US/products/hw/products/hw/switches/ps5023/products_white_paper09186a00801b096a.shtml (Catalyst 3750 announced on Apr. 15, 2003).
Knight, S. et al. Virtual Router Redundancy Protocol, IETF, Apr. 1998, 27 pages.
International Search Report dated Aug. 2, 2005, from related International Application No. PCT/US2004/029554, 6 pages.
Written Opinion of the International Searching Authority dated Aug. 2, 2005 from related International Application No. PCT/US2004/029554, 5 pages.
International Search Report dated Jan. 14, 2005 from corresponding International Application No. PCT/US2004/029553, 4 pages.
Written Opinion of the International Searching Authority dated Jan. 14, 2005 from corresponding International Application No. PCT/US2004/029553, 6 pages.
CIPO Examination Report in related Canadian Patent Application No. 2,534,511 dated May 1, 2006, 4 pages.
Cisco Systems, Inc.: Copyright 1989-1997, http://www.cisco.com/univered/cc/td/doc/product/rtrmgmt/sw_ntman/cwsimain/cwsi2/cwsiug2/vlan2/stpapp.htm; "Understanding Spanning-Tree Protocol," Appendix C, pp. C-1 through C-12.
Pedroso, Carlos Marcelo and Fonseca, Keiko, *Modeling Weight Round Robin Packet Scheduler With Petri Nets*, Communication Systems, IEEE, vol. 1, Nov. 25, 2002, pp. 342-345.
Liu, Dake, et al, *Configuration-Based Architecture for High Speed and General-Purpose Protocol Processing*, Signal Processing Systems, IEEE, Oct. 20, 1999, pp. 540-547.

\* cited by examiner

INTERFACE BUNDLES IN VIRTUAL NETWORK DEVICES

BACKGROUND OF THE INVENTION

1. Field of the Invention

The present invention relates to networking and, more specifically, to implementing an interface bundle in a virtual network device.

2. Description of the Related Art

In order to provide increased network reliability, redundant switches and links are often included in a network. If a switch or link fails, a redundant switch or link, already in place within the network, can quickly be enabled to replace the failed switch or link. Since the redundant switch or link can typically be enabled as a replacement more quickly than the failed component can be replaced or repaired, having redundant links and/or switching can provide a more reliable network.

When redundant components are included within a network, it is often desirable to be able to use the redundant components during normal network operation, before the failure of corresponding components. For example, if two links are implemented between a pair of switches, it is desirable to use both links (as opposed to leaving one link idle) to provide increased bandwidth. However, if multiple redundant links are active at the same time, management of those links may be undesirably complicated (e.g., due to the need to avoid bridging loops).

One way to avoid the complexity of having several independent redundant links is to operate those links as single logical transmission path, such as that provided using a link bundling technique like EtherChannel™ or link aggregation (defined in IEEE 802.3). For example, an EtherChannel™ port bundle can be formed from several ports on a switch, each of which is coupled to a respective link in a group of links coupling that switch to another switch. Once an EtherChannel™ port bundle is formed, the port bundle can be managed as a single bridge port by routing protocols such as spanning tree, thus simplifying management of the redundant links.

Currently, there are situations in which link bundling techniques cannot be used. For example, currently all of the ports in an EtherChannel™ port bundle must be included in the same network device. It is desirable to extend the situations in which port bundles can be used.

SUMMARY OF THE INVENTION

Various embodiments of methods and systems for implementing interface bundles in virtual network devices are disclosed. A virtual network device includes several different virtual network device sub-units, which collectively operate as a single logical network device. An interface bundle includes interfaces in more than one of the different virtual network device sub-units included in the virtual network device.

In one embodiment, a system includes a virtual link bundle, which includes several communication links. A first end of each of the communication links is configured to be coupled to a first network device. A second end of a first one of the communication links is configured to be coupled to a first virtual network device sub-unit within a virtual network device, and a second end of a second one of the communication links is configured to be coupled to a second virtual network device sub-unit within the virtual network device. The communication links are configured to be managed as a single link. When the first network device sends a packet to the virtual network device via the virtual link bundle, the first network device selects one of the communication links on which to send the packet. Each packet sent between the virtual network device and the first network device is sent via only a one of the communication links.

In some embodiments, a system includes a first virtual network device sub-unit. The first virtual network device sub-unit includes a first interface and a controller coupled to the first interface. The controller is configured to forward packets received via the first interface. The first interface is identified by a first logical identifier, which also identifies a second interface included in a second virtual network device sub-unit. The first interface and the second interface are part of the same interface bundle. For packets to be forwarded via the interface bundle, the first virtual network device sub-unit can prioritize sending packets to the first interface (which is local to the first virtual network device sub-unit) over sending the packets via the second interface (which is part of the second virtual network device sub-unit).

In such embodiments, the first virtual network device sub-unit can be configured to maintain consistent forwarding information with the second virtual network device sub-unit. For example, in one embodiment, the controller (in the first virtual network device sub-unit) is configured to perform control protocol processing for the first interface according to a routing protocol running on the interface bundle. The controller is configured to provide information generated when performing the control protocol processing to a secondary controller comprised in the second virtual network device sub-unit. The secondary controller is configured to use the information to manage the second interface.

One embodiment of a method involves: assigning a first logical identifier to each interface included within an interface bundle, where the interface bundle includes a first interface of a first virtual network device sub-unit and a second interface of second virtual network device sub-unit; coupling a first end of a first link to the first interface, the first link included within a virtual link bundle; and coupling a first end of second link to the second interface, the second link also included within the virtual link bundle. The second end of each of the first link and the second link are coupled to a third network device.

Another embodiment of a method involves: sending a first packet via a first link of a virtual link bundle if a destination identifier associated with the first packet identifies the virtual link bundle; and sending a second packet via a second link of the virtual link bundle if a destination identifier associated with the second packet identifies the virtual link bundle. The first link is coupled to a first virtual network device sub-unit and the second link is coupled to a second virtual network device sub-unit.

Yet another embodiment of a method involves: receiving a packet, where a destination identifier for the packet identifies an interface bundle that includes a first interface; and filtering the packet from a packet flow being sent via the first interface if the packet was received via a virtual network device link. The virtual network device link couples two virtual network device sub-units within a virtual network device. If the packet was not received via the virtual network device link, the packet is sent via the first interface.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
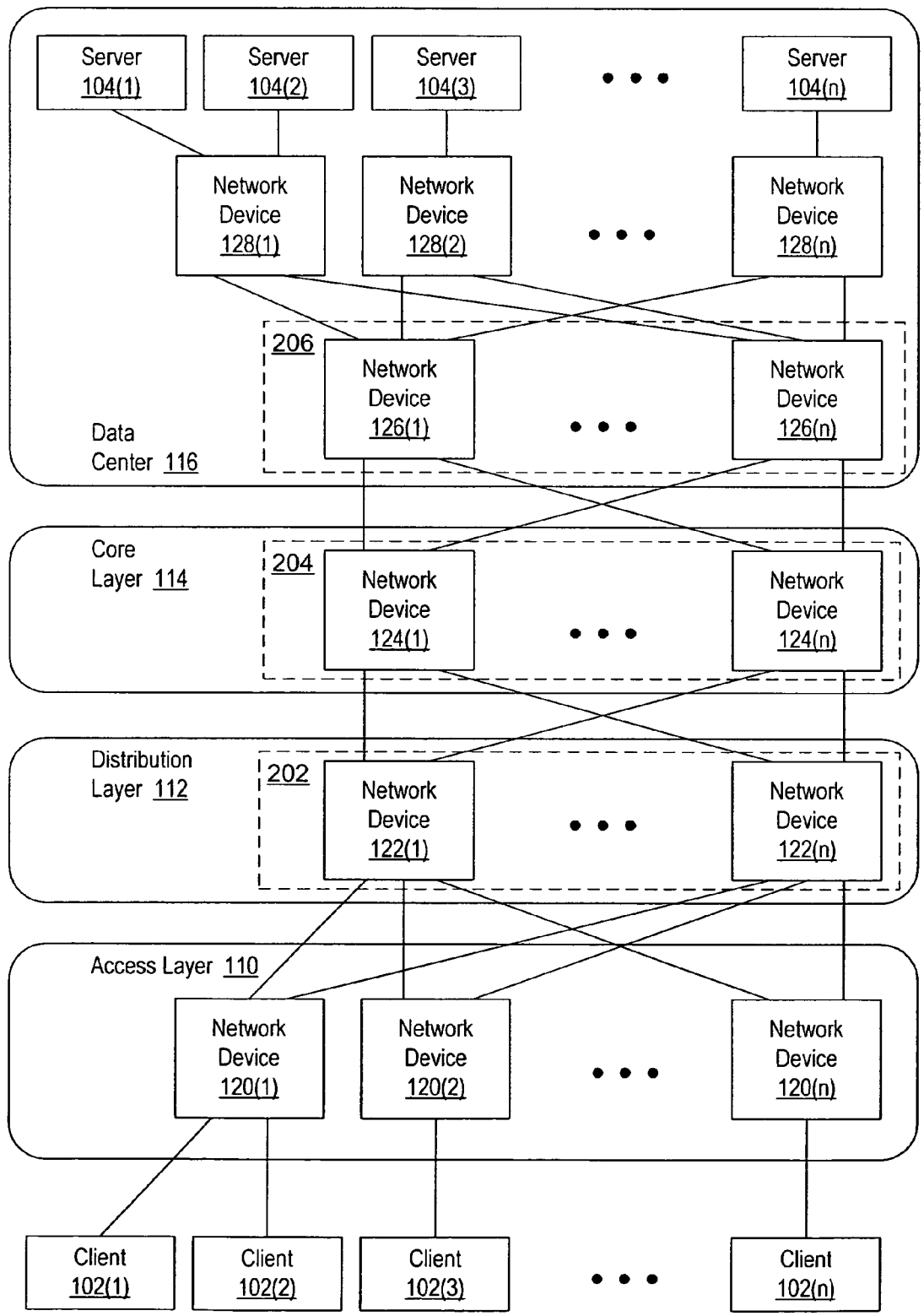
FIG. 1 is a block diagram of a network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a network in which an interface bundle can be implemented in a virtual network device. In FIG. 1, several clients 102(1)-102(n) communicate with each other and with several servers 104(1)-104(n) via a network. Clients 102(1)-102(n) can include a variety of different devices that access networked services. For example, client 102(1) can be a cell phone, client 102(1) can be a personal computer, and client 102(n) can be a Personal Digital Assistant (PDA). Servers 104(1)-104(n) provide various services, such as various software-based services and/or access to shared storage devices.

The network coupling clients 102(1)-102(n) and servers 104(1)-104(n) is described in terms of several network layers. The layer closest to clients 102(1)-102(n) is access layer 110. Access layer 110 includes several network devices 120(1)-120(n). In this example, access layer 110 is the primary layer at which packets enter the network from clients 102(1)-102(n).

Distribution layer 112 aggregates flows received via access layer 110 and provides these aggregated flows to core layer 114. In this example, distribution layer 112 includes network devices 122(1)-122(n). Core layer 114 is a logically centralized portion of the network through which various aggregated flows pass. Core layer 114 includes network devices 124(1)-124(n).

In this example, data center 116 includes two sets of network devices: network devices 126(1)-126(n) and network devices 128(1)-128(n). Network devices 128(1)-128(n) provide access to the network to various servers 104(1)-104(n). Network devices 126(1)-126(n) aggregate flows from network devices 128(1)-128(n) and provide the aggregated flows to core layer 114.

It is noted that in some embodiments, networks will not include the network layers illustrated in FIG. 1 (e.g., some of the layers can be combined and/or eliminated, and alternative layers can also be included in addition to and/or instead of those shown in FIG. 1). Additionally, clients and servers can be coupled to the network differently than shown in FIG. 1 (e.g., some clients and/or servers can be coupled to individual network devices in the core and/or distribution layers). Additionally, the physical locations of devices relative to each other can differ from the logical locations shown in FIG. 1. For example, two devices in the same network layer can be physically located on different floors, in different buildings, or on different campuses. In contrast, two devices in different network layers can be located in the same room.

In some embodiments, network devices 120(1)-120(n) and 128(1)-128(n), which are located at the outer edges of the network, can operate differently than network devices 122(1)-122(n), 124(1)-124(n), and 126(1)-126(n), which are located in the inner layers of the network. For example, in one embodiment, network devices 120(1)-120(n) are satellite network devices that are controlled or otherwise subordinate to network devices in the inner layers (e.g., the distribution and core layers) of the network. In such an embodiments, the non-satellite network devices provide L2 (Layer 2) and L3 (Layer 3) forwarding and routing, while satellite-network devices only have relatively limited forwarding and/or routing capabilities. In other embodiments, satellite network devices do not perform any L2 forwarding or L3 routing. Instead, the satellite network devices simply forward all packets to non-satellite network devices for L2 forwarding and L3 routing. Non-satellite network devices coupled to satellite network devices can, in some embodiments, control the operation of the satellite network devices. For example, network devices 126(1)-126(n) can configure network devices 128(1)-128(n) according to various routing protocols. In some embodiments, satellite network devices are treated as remote line cards of the network devices to which the satellites are subordinate. It is also noted that in alternative embodiments, non-satellite network devices can be used in the access layer and data center instead of satellite network devices.

Network devices 120(1)-120(n), 122(1)-122(n), 124(1)-124(n), 126(1)-126(n), and 128(1)-128(n) can include various routers, switches, gateways, and other network equipment. In many embodiments, only one network device may be needed at each layer in order for the network to function. However, multiple network devices can be included at each layer, as shown in FIG. 1, in order to provide redundancy.

It will be noted that the variable identifier "n" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements have the same number of elements as another series delimited by the same variable identifier (e.g., the number of network devices in each network layer may vary). Rather, in each instance of use, the variable identified by "n" (or any other such identifier) may hold the same or a different value than other instances of the same variable identifier.

Multiple links can be implemented between devices in different network layers to provide additional redundancy. For example, as shown in FIG. 1, each network device 120 (1)-120(n) in access layer 110 can be coupled to distribution layer 112 by two (or more) different links. Similarly, each network device 122(1)-122(n) in distribution layer 112 can be coupled to core layer 114 by two (or more) different links. In one embodiment, each link is an Ethernet link.

Figure 2A:
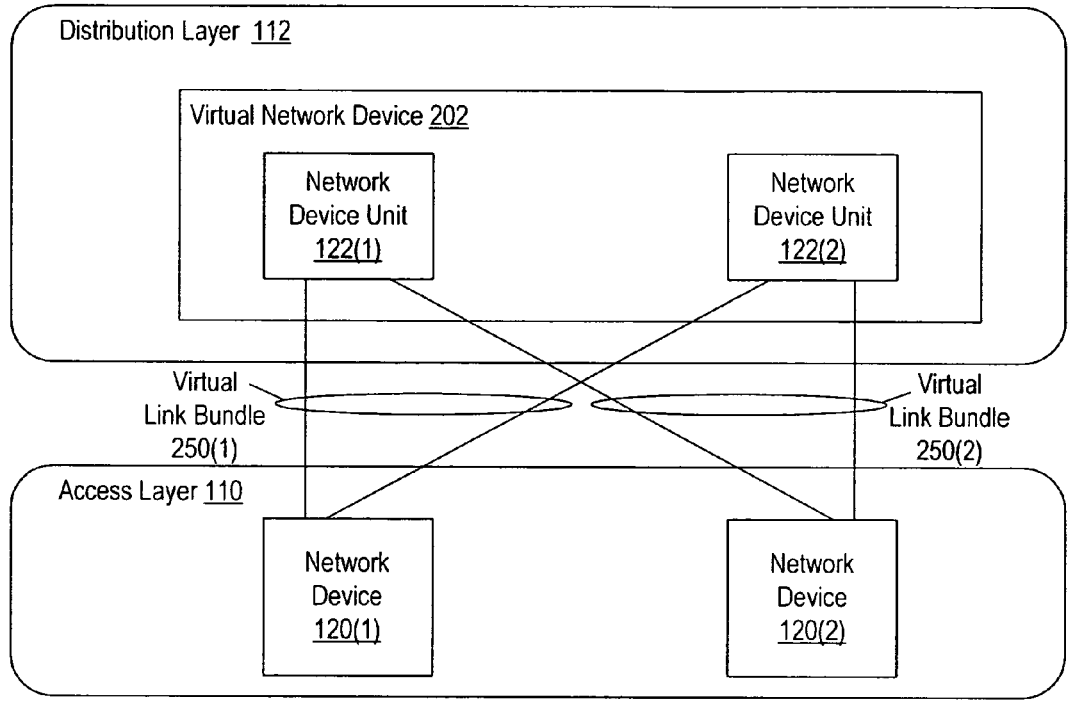
FIGS. 2A and 2B show how two network devices in the same network layer can collectively operate as a single virtual network device, according to one embodiment of the present invention.
Figure 2B:
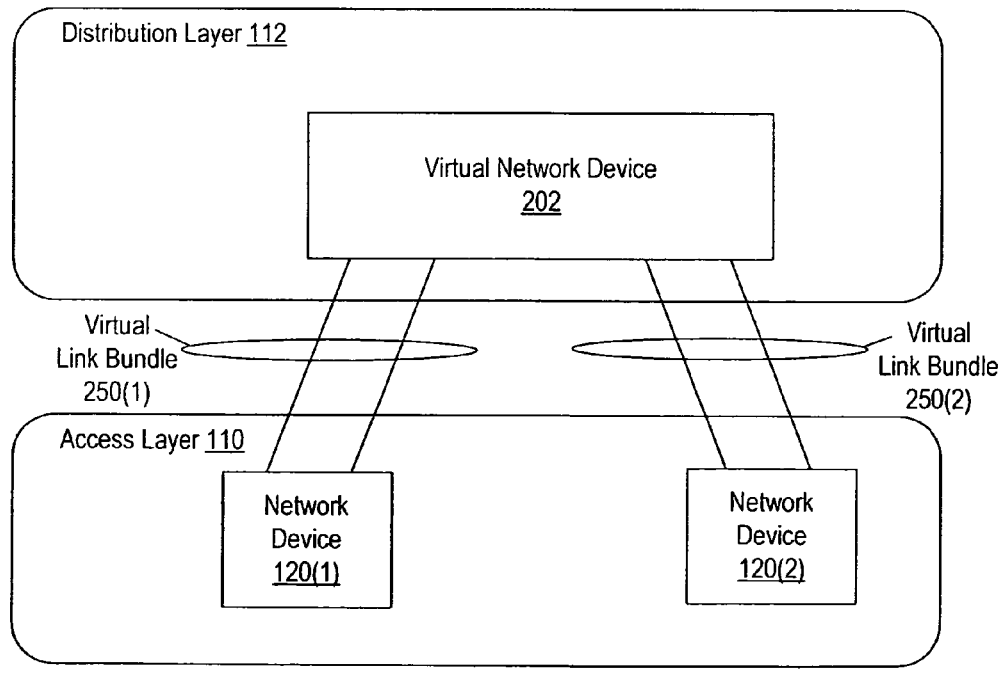
Figure 3:
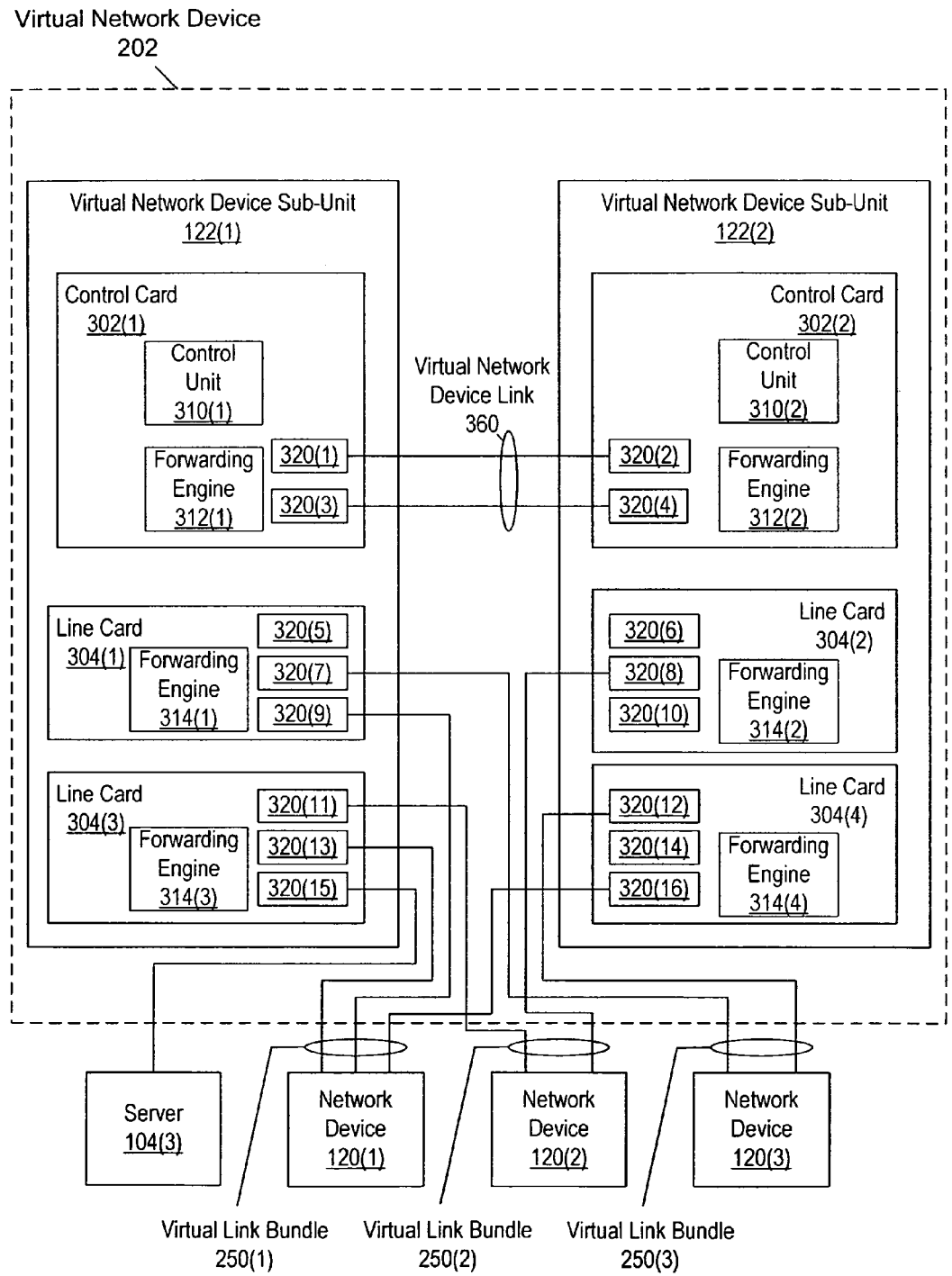
FIG. 3 shows more detail within each virtual network device sub-unit included in a virtual network device, according to one embodiment of the present invention.

Within each network layer, multiple redundant network devices can be configured to collectively operate as a single virtual network device. For example, as shown in FIG. 1, two or more network devices in distribution layer 112 can operate as a virtual network device 202. Similarly, two or more of network devices 124(1)-124(n) can operate as a single virtual network device 204, and two or more of network devices 126(1)-126(n) can operate as a single virtual network device 206. More details of how two distribution-layer network devices can collectively operate as a distribution-layer virtual network device 202 are shown in FIGS. 2A, 2B, and 3. Virtual network devices can be coupled to other virtual network devices, to network devices, and/or to clients and/or servers by virtual link bundles, as described below. In general, any multi-ported device (whether a physical device, such as a network device, client, or server, or a virtual network device) can be coupled to a virtual network device by a virtual link bundle that includes several links, some of which terminate on different sub-units within the virtual network device.

FIG. 2A shows an example of a network in which there are two network devices 120(1) and 120(2) in access layer 110. There are also two network devices 122(1) and 122(2) in distribution layer 112. These two network devices 122(1) and 122(2) operate as a single virtual network device 202 in this example. Each network device 120(1)-120(2) is coupled to distribution layer 112 by two links. In this example, each of those two links is coupled to a different one of network devices 122(1) and 122(2). This provides redundancy, allowing network devices 120(1) and 120(2) to continue to communicate with distribution layer 112 even if one of network devices 122(1) or 122(2) fails or if one of the links between a given access-layer network device and a given distribution-layer network device fails.

The redundant links coupling each of network devices 120(1) and 120(2) to virtual network device 202 can be operated as a single logical link, referred to herein as a virtual link bundle. Network device 120(1) operates the two links coupling network device 120(1) to virtual network device 202 as a virtual link bundle 250(1). In such an embodiment, each interface in network device 120(1) that is coupled to one of the links is included in an interface bundle, which corresponds to virtual link bundle 250(1). Network device 120(2) similarly operates the two links coupling network device 120(2) to virtual network device 202 as virtual link bundle 250(2). In some embodiments, virtual link bundles 250(1) and 250(2) are each operated as an EtherChannel™ or as an aggregated link (as described in IEEE 802.3).

As shown in FIG. 2A, each virtual link bundle 250(1) and 250(2) includes links that terminate at different network devices in distribution layer 112. For example, virtual link bundle 250(1) couples network device 120(1) to both network device 122(1) and network device 122(2). This differs from conventional implementations in which logical links are only allowed between a single pair of network devices.

In some embodiments, network devices 120(1) and 120(2) are aware (e.g., through various state information maintained within each network device) that each virtual link bundle 250(1) and 250(2) includes links that are terminated on different network devices in distribution layer 112. In such an embodiment, network devices 120(1) and 120(2) may select a link within a particular virtual link bundle on which to send a packet based on this awareness.

In other embodiments, network devices 122(1) and 122(2) operate to conceal the fact that such a single logical link actually includes links that are terminated at different network devices. For example, as shown in FIG. 2A, network devices 122(1) and 122(2) can operate as a single virtual network device 202. FIG. 2B illustrates how, from the perspective of network device 120(1) in access layer 110, network device 120(1) is coupled to a single network device, virtual network device 202, in distribution layer 112 by a redundant pair of links. Network device 120(2) has a similar perspective of virtual network device 202.

In embodiments, such as the one shown in FIG. 2B, in which network devices 120(1) and 120(2) see themselves as being connected to a single network device, the use of a virtual link bundle is simplified. For example, if network device 120(1) is aware that virtual link bundle 250(1) terminates at two different network devices, network device 120(1) can select a link on which to send a particular packet based on Spanning Tree Protocol. The use of Spanning Tree Protocol may involve more overhead and/or be more restrictive with respect to which links can be used to send a given packet (e.g., Spanning Tree Protocol might block all but one of the links, preventing utilization of all but one non-blocked link) than if network device 120(1) simply views virtual network device 202 as a single entity. When viewing virtual network device 202 as a single entity, for example, network device 120(1) can simply select a link on which to send a packet based on load-sharing constraints. Similarly, if a link within virtual link bundle 250(1) fails, there is no need for network device 120(1) to change how Spanning Tree Protocol is applied. Instead, network device 120(1) can simply continue to use the non-failed links within virtual link bundle 250(1).

The individual network devices, such as network device 122(1) and 122(2), included in virtual network device 202 are each referred to herein as a "virtual network device sub-unit". In some embodiments, virtual network device sub-units 122 (1) and 122(2) are each implemented in a separate chassis (i.e., each chassis houses a single virtual network device sub-unit). For example, in FIG. 2A, network devices 122(1) and 122(2) can each have its own chassis. Even if virtual network device sub-units 122(1) and 122(2) share a chassis, each virtual network device sub-unit can be made to operate as an independent network device, allowing one virtual network device sub-unit to continue operating if the other virtual network device sub-unit(s) in the virtual network device fail. For example, virtual network device sub-unit 122(1) and virtual network device sub-unit 122(2) can be in the same chassis, but each virtual network device sub-unit can have independent hardware, ports, uplink interfaces, and power supplies, and each can be removed from the chassis independently of the other. If virtual network device sub-unit 122(1) fails (e.g., due to a power supply failure or a software error), virtual network device sub-unit 122(2) can continue to run. In such an embodiment, virtual network device sub-unit 122(1)

can be removed for repair or replacement without disrupting the operation of virtual network device sub-unit 122(2).

In some embodiments, the links in a virtual link bundle coupling a network device to a satellite network device are specialized links, referred to herein as uplinks, that are used to couple a satellite network device to a virtual network device. Each uplink can convey both a packet and additional information generated within one of the network devices. This additional information can be similar to additional information conveyed between line cards within a conventional network device. For example, if a packet is being conveyed on an uplink from an access-layer satellite network device to a distribution-layer network device, additional information conveyed on the uplink with the packet can include information identifying which of the satellite network device's ports received the packet. The additional information can also include information indicating whether any forwarding or routing has already been performed on the packet by the sending device. In some embodiments, use of uplinks allows a virtual network device to control satellite network devices that are coupled to that virtual network device. The use of uplinks can also facilitate the virtual network device being able to perform routing and/or forwarding for subordinate satellite network devices. An interface within a network device or satellite network device that is coupled to an uplink is referred to herein as an uplink interface.

FIG. 3 shows more detail within each network device included in a virtual network device. Here, virtual network device 202 includes two virtual network device sub-units 122(1) and 122(2). It is noted that in other embodiments, virtual network device 202 can include more than two component network devices. In this example, virtual network device 202 is located at the distribution layer of the network. However, similar virtual network devices can be implemented in other network layers (e.g., within the data center and/or core layer).

Virtual network device 202 is coupled to several access-layer network devices 120(1)-120(3). Network devices 120(2) and 120(3) are each coupled to virtual network device 202 by two uplinks, one to each virtual network device sub-unit 122(1) and 122(2). Network device 120(2) is coupled to virtual network device by virtual link bundle 250(2), and network device 120(3) is coupled to virtual network device 202 by virtual link bundle 250(3). As a result, network devices 120(2) and 120(3) can continue to communicate with the distribution layer even if one of these uplinks and/or one of virtual network device sub-units 122(1) and 122(2) fail. Network device 120(1) is coupled to virtual network device 202 by three uplinks: two uplinks to virtual network device sub-unit 122(1) and one uplink to virtual network device sub-unit 122(2). These three uplinks collectively form virtual link bundle 250(1). Network device 120(1) can continue to communicate with the distribution layer even if two of the three uplinks and/or one of virtual network device sub-units 122(1) and 122(2) fail. Network devices 120(1)-120(3) each operate their multiple uplinks to virtual network device 202 as a single logical uplink. Additionally, in some embodiments, each network device 120(1)-120(3) can operate as if that network device is coupled to a single distribution-layer device, virtual network device 202, instead of operating as if that network device were coupled to two independent distribution-layer network devices.

Distribution-layer virtual network device sub-unit 122(1) is also coupled to a server 104(3) by a single link. Unlike access-layer network devices 120(1)-120(3), server 104(3) does not view distribution-layer network devices units 122(1) and 122(2) as a single logical network device. In this example, server 104(3) will be unable to communicate via the distribution layer if either network device 122(1) or the link coupling server 104(3) to network device 122(1) fails. It is noted that in alternative embodiments, a server such as server 104(3) but having multiple ports could be coupled to each virtual network device sub-unit by a virtual link bundle, and that such a server could interact with virtual network device sub-units 122(1) and 122(2) as if those sub-units were a single virtual network device 202.

Virtual network device sub-unit 122(1) includes several cards, including control card 302(1) and line cards 304(1) and 304(3). Similarly, virtual network device sub-unit 122(2) includes control card 302(2) and line cards 304(2) and 304(4). Control card 302(1) includes control unit 310(1), forwarding engine 312(1), and interfaces 320(1) and 320(3). Control card 302(2) likewise includes control unit 310(2), forwarding engine 312(2), and interfaces 320(2) and 320(4).

In virtual network device sub-unit 122(1), line card 304(1) includes forwarding engine 314(1) and interfaces 320(5), 320(7), and 320(9). Interface 320(7) is coupled to network device 120(3). Interface 320(9) is also coupled to network device 120(1). Interface 320(5) is unused in this example. Line card 304(3) includes forwarding engine 314(3), interfaces 320(11) and 320(13), and port 320(15). Interfaces 320(11) and 320(13) are respectively coupled to network devices 120(2) and 120(1). Interface 320(15) is coupled to server 104(3). In embodiments in which network devices 120(1)-120(3) are satellite network devices controlled by virtual network device 202, interfaces 320(7), 320(9), 320(11), and 320(13) can be operated as uplink interfaces, while interface 320(15), which is not coupled to a satellite network device, is operated as a normal port.

In virtual network device sub-unit 122(2), line card 304(2) includes forwarding engine 314(2) and interfaces 320(6), 320(8), and 320(10). Interface 320(8) is coupled to satellite network device 120(2), and interfaces 320(6) and 320(10) are unconnected. Line card 304(4) includes forwarding engine 314(4) and interfaces 320(12), 320(14), and 320(16). Interfaces 320(12) and 320(16) are respectively coupled to satellite network devices 120(3) and 120(1). Interface 320(14) is unused. In embodiments in which network devices 120(1)-120(3) are satellite network devices controlled by virtual network device 202, interfaces 320(8), 320(12), and 320(16) can be operated as uplink interfaces, Note that while the interfaces in FIG. 3 have been described as both ingress and egress interfaces, interfaces that act as ingress-only or egress-only interfaces can also be used. For example, the functionality of each of the interfaces shown in FIG. 3 can be implemented using one ingress-only interface and one egress-only interface. Similarly, virtual link bundles 250(1)-250(3) can each include several links that only convey packets from a respective network device 120(1)-120(3) to virtual network device 202 and several links that only convey packets from virtual network device 202 to a respective network device 120(1)-120(3).

In the illustrated embodiment, control card 302(1) in virtual network device sub-unit 122(1) is coupled to control card 302(2) in virtual network device sub-unit 122(2) via a virtual network device link 360. In this example, virtual network device link 360 includes two links (two links are used to provide increased fault-tolerance and/or bandwidth; however, one link can be used in other embodiments). These links are a type of uplink in this example, carrying information (e.g., such as headers similar to those sent between line cards) in addition to packets. The uplinks in virtual network device link 360 are used to exchange information, which controls the operation of virtual network device 202, as well as packets between virtual network device sub-units 122(1) and 122(2). By communicating via these uplinks, virtual network device sub-units 122(1) and 122(2) can coordinate their behavior such that they appear to be a single virtual network device to network devices 120(1)-120(3).

Thus, providing interconnections between virtual network device sub-units 122(1) and 122(2) can allow virtual network device sub-units 122(1) and 122(2) to operate as a single virtual network device 202. Network devices 120(1)-120(3) communicate with virtual network device 202 in the same way that network devices 120(1)-120(3) would communicate with a single physical device. For example, if network device 120(2) is handling a packet addressed to server 104(3), network device 120(2) can select one of the two uplinks in network device bundle 250(2) on which to send the packet. This selection can be based on load-sharing criteria. In such a situation, since virtual network device 202 appears to be a single network device, network device 120(2) is just as likely to select the uplink to virtual network device sub-unit 122(2) as the uplink to virtual network device sub-unit 122(1), despite the fact that only virtual network device sub-unit 122(1) has a direct connection to server 104(3). If the packet is sent to virtual network device sub-unit 122(2), network device 122(2) can then use one of the uplinks included in virtual network device link 360 between virtual network device sub-units 122(1) and 122(2) to send the packet to virtual network device sub-unit 122(1), and virtual network device sub-unit 122(1) can in turn provide the packet to its destination, server 104(3).

In other embodiments, network devices 120(1)-120(3) may be aware that their virtual link bundles 250(1) and 250(2) actually terminate on two different network devices. Network devices 120(1)-120(3) can control packet transmission based on this information. For example, in this situation, network device 120(2) may handle a packet addressed to server 104(3) by selecting the uplink coupled to virtual network device sub-unit 122(1) instead of the uplink coupled to virtual network device sub-unit 122(2), based on the fact that network device 120(2) recognizes separate connections to two different network devices within the logical link.

Interfaces 320(13), 320(9), and 320(16), which are each coupled to network device 120(1) by virtual link bundle 250(1), form an interface bundle (e.g., an EtherChannel™ port bundle). Similarly, interfaces 320(11) and 320(8) form another interface bundle that is coupled to network device 120(2) by virtual link bundle 250(2). Interfaces 320(7) and 320(12) form a third interface bundle that is coupled to network device 120(3) by virtual link bundle 250(3). Within virtual network device 202, each interface in the same interface bundle is assigned the same logical identifier. For example, interfaces 320(13), 320(9), and 320(16) are each assigned the same logical identifier. In some embodiments, packets received via one of these interfaces can be tagged or otherwise associated with the logical identifier to indicate that those packets were received via the virtual link bundle coupling virtual network device 202 to network device 120(1). It is noted that similar interface bundles are implemented within each network device 120(1)-120(3), and that interfaces included in such bundles can also be assigned the same logical identifier by each network device (or by virtual network device 202, in embodiments in which virtual network device 202 controls the configuration of the network devices 120(1)-120(3)). For example, network device 120(1) can assign the same logical identifier to each of the interfaces coupled to virtual link bundle 250(1).

The association between a packet and a particular logical identifier can be used by forwarding engines within virtual network device 202 to route and forward packets to and from network devices 120(1)-120(3). For example, when a packet from a sending device (e.g., a client coupled to network device 120(1)) is received via uplink interface 320(13), virtual network device sub-unit 122(1) can learn that the sending device's MAC (Media Access Control) address is "behind" uplink interface 320(13) by associating the MAC address with the logical identifier of uplink interface 320(13). Virtual network device sub-unit 122(1) can inform each forwarding engine in virtual network device sub-unit 122(1) as well as each forwarding engine in virtual network device sub-unit 122(2) of this association. Based on the association, packets addressed to that MAC address will be sent from an uplink interface having the associated logical identifier. Since in this case, uplink interfaces 320(9) (in virtual network device sub-unit 122(1)) and 320(16) (in virtual network device sub-unit 122(2)) also have the same logical identifier as uplink interface 320(13), a packet addressed to that MAC address can be forwarded via any of uplink interfaces 320(9), 320(13), and 320(16).

The same logical identifiers can be used to identify uplink interface bundles by each of virtual network device sub-units 122(1) and 122(2), and the virtual network device sub-units coordinate to assign the same logical identifier to each uplink interface within the same uplink interface bundle. When forwarding packets via an uplink interface bundle identified by a particular logical identifier, each virtual network device sub-unit 122(1) and 122(2) generates a hash value to select one of the uplink interfaces within that uplink interface bundle on which to send the packet. Each of the virtual network device sub-units uses these hash values to identify local uplink interfaces within that virtual network. Thus, each virtual network device sub-unit will only select an uplink interface that is local to that virtual network device sub-unit. For example, if virtual network device sub-unit 122(1) is forwarding a packet via the uplink interface bundle that includes interfaces 320(9), 320(13), and 320(16), the hash value generated by virtual network device sub-unit will identify one of its interfaces 320(9) or 320(13).

In the above example, by associating each hash value with local uplink interfaces in the uplink interface bundle, the usage of virtual switch link 360 is reduced. Essentially, virtual network device sub-unit 122(1) favors its local uplink interfaces within a particular uplink interface bundle over remote uplink interfaces, in the same uplink interface bundle, on virtual network device sub-unit 122(2). Likewise, virtual network device sub-unit 122(2) favors its local uplink interfaces within a particular uplink interface bundle over uplink interfaces included in virtual network device sub-unit 122(1). For example, if virtual network device sub-unit 122(2) needs to forward a packet via an uplink interface, virtual network device sub-unit 122(2) will send that packet via uplink interface 320(12) instead of forwarding that packet across virtual network device link 360 to be sent via uplink interface 320(7). By favoring local interfaces, the amount of traffic sent over virtual network device link 360 can be reduced, since each virtual network device sub-unit 122(1) and 122(2) will forward locally-received packets (i.e., packets received via interfaces other than those coupled to virtual network device link 360) from a local interface. FIGS. 6A-6D, described below, show a more detailed example of how traffic across virtual network device link 360 can be avoided by favoring local interfaces within the first virtual network device sub-unit to handle a particular packet.

For a given virtual link bundle, that virtual link bundle can be managed (e.g., with respect to control protocols such as L2 protocols) in a central location. For example, all of the control protocol processing for virtual link bundle 250(1) can take place in control unit 310(1) of virtual network device sub-unit 122(1). The results of this control protocol processing can then be communicated to control unit 310(2) of virtual network device sub-unit 122(2) and/or to a controller in network device 120(1). Control unit 310(2) can then use (but not modify) this information when controlling how packets sent from and received via uplink interface 320(16) (which is in the uplink interface bundle coupled to virtual link bundle 250(1)) are handled. For example, control unit 310(2) can use this information to set up or modify lookup tables on line cards 304(2) and/or 304(4). In this way, the actual control protocol processing is centralized in control unit 310(1), as opposed to being distributed among several control units in virtual network device 202.

The central point of control protocol processing can vary among virtual link bundles. For example, while control protocol processing for virtual link bundle 250(1) is managed by control unit 310(1), control protocol processing for virtual link bundle 250(2) can be managed by control unit 310(2). In other words, control unit 310(2) can perform all of the control processing for virtual link bundle 250(2), and the information generated by control unit 310(2) can then be communicated to control unit 310(1) for use (but not modification) within virtual network device sub-unit 122(1).

In embodiments that implement a central point of management within virtual network device 202 for each virtual link bundle's control protocol processing, L2 protocols can be run across the virtual link bundle and/or interface bundles can be used as routed L3 interfaces. These abilities would not be available if the virtual network device sub-units within virtual network device 202 each performed control protocol processing for their local interface bundles independently of each other. Additionally, in embodiments implementing a central point of control protocol processing, a user can modify the virtual link bundle's control protocol behavior by accessing a single virtual network device sub-unit. In the above example, when updating control protocol behavior of virtual link bundle 250(1), a user can simply access virtual network device sub-unit 122(1) (instead of accessing both virtual network device sub-units 122(1) and 122(2)). Virtual network device sub-unit 122(1) can then automatically propagate to network device 122(2) any changes made by the user to the control protocols. Furthermore, since the use of virtual link bundles allows several uplinks to be managed as a single logical uplink, fewer uplink interfaces need to be configured than would be required if virtual link bundles were not used. For example, if each virtual link bundle includes two uplinks, the number of uplink interfaces within virtual network device 202 that need to be configured by a user is halved.

Virtual network device sub-units 122(1) and 122(2) can implement certain behaviors in order to act as a virtual network device 202 that, from the perspective of network devices 120(1)-120(3), appears to be a single logical network device. For example, whenever virtual network device sub-unit 122(2) receives a packet from a local network device, client, or server and that packet's destination logical identifier identifies an uplink interface bundle, virtual network device sub-unit 122(2) sends the packet from a local uplink interface within the identified uplink interface bundle. Virtual network device sub-unit 122(2) can also provide the packet to virtual network device sub-unit 122(1), but virtual network device sub-unit 122(1) should not itself output this packet on a virtual link bundle. This way, the destination device only receives one copy of the packet from virtual network device 202 (as opposed to receiving one copy from each virtual network device sub-unit 122(1) and 122(2)) and the appearance of virtual network device 202 being a single entity is maintained.

To operate in this way, each egress uplink interface coupled to a link in a virtual link bundle is configured to filter out traffic received via virtual network device link 360. For example, a packet can be received at virtual network device sub-unit 122(1) via virtual network device link 360. The interface 320(1) or 320(3) that receives the packet can update information (e.g., in a header) associated with the packet to indicate that the packet was received via virtual network device link 360 (in alternative embodiments, the sending interface in virtual network device sub-unit 122(2) can update this information). When virtual network device sub-unit 122 (1) looks up the destination address of the packet in a lookup table, the lookup table returns the logical identifier that identifies local uplink interfaces 320(9) and 320(13). The packet is then forwarded to uplink interface 320(13) (e.g., selected based on load-sharing considerations). When uplink interface 320(13) receives the packet, uplink interface 320(13) will only output the packet if the packet was not received via virtual switch link 360, since if the packet was received via the virtual switch link, the other virtual network device sub-unit 122(2) will have already sent the packet via the virtual link bundle. Thus, uplink interface 320(13) can filter the packet from the packet flow being sent via uplink interface 320(13) based on the information appended to the packet that indicates whether the packet was received via virtual network device link 360.

In some embodiments, MAC notification frames are used to keep the content of the L2 tables in virtual network device sub-unit 122(1) synchronized with the content of the L2 tables in virtual network device sub-unit 122(2) and vice versa. Whenever a MAC notification that involves a port behind a virtual link bundle or an uplink interface included in an uplink interface bundle is generated within a virtual network device sub-unit (e.g., such a notification can be generated by one line card in order to update an L2 table on another line card), a copy of the MAC notification is sent via to virtual network device link 360. Similarly, if a virtual network device sub-unit determines that a packet should be flooded, the virtual network device sub-unit will send a copy of that packet via virtual network device link 360, ensuring that the virtual network device sub-unit will receive a copy of any MAC notification response generated by a forwarding engine in the peer virtual network device sub-unit.

By way of example, assume that virtual network device sub-unit 122(1) floods a packet because the forwarding engine(s) included in virtual network device sub-unit 122(1) do not know which port or uplink interface is associated with the packet's destination address. As part of flooding the packet, virtual network device sub-unit 122(1) sends a copy of the packet to virtual network device sub-unit 122(2) via virtual switch link 360. If a forwarding engine within virtual network device sub-unit 122(2) already knows that the destination address is behind a particular uplink interface or port (e.g., if a forwarding table already includes an entry associating the destination address with a port of one of network devices 120), that forwarding engine generates a MAC notification identifying this association, which is distributed to any other forwarding engines within virtual network device sub-unit 122(2). Since the packet was originally received via virtual network device link 360, virtual network device sub-unit 122(2) also sends a copy of the MAC notification back via virtual network device link 360. This MAC notification can then be distributed among the forwarding engines included in virtual network device sub-unit 122(1). After being updated based on the MAC notification, the forwarding engines in virtual network device sub-unit 122(1) now know the location of the device identified by the destination address. Accordingly, subsequently-received packets addressed to that device will not be flooded.

When all of the physical links in a virtual link bundle that connect to a single virtual network device sub-unit fail, the virtual link bundle transitions to a normal link bundle that is coupled to a single virtual network device sub-unit. At this point, the behavior of each virtual network device sub-unit with respect to that network device bundle is modified. For example, assume that all of the uplinks in virtual link bundle 250(1) that are coupled to virtual network device sub-unit 122(2) fail. At this point, virtual network device sub-unit 122(2) no longer has any local uplink interfaces that can send packets via virtual link bundle 250(1). Accordingly, virtual network device sub-unit 122(2) will redirect all traffic that needs to be sent via virtual link bundle 250(1) across virtual network device link 360. Additionally, since network device 122(2) can no longer send packets via virtual link bundle 250(1), virtual network device sub-unit 122(1) will cease to filter traffic received via virtual network device link 360 from being sent via virtual link bundle 250(1). If at least one of the uplinks in virtual link bundle 250(1) that is coupled to virtual network device sub-unit 122(2) is restored, virtual link bundle 250(1) will transition back to its normal mode of operation, in which virtual network device sub-unit 122(2) will send locally-received packets via virtual link bundle 250(1) and virtual network device sub-unit 122(1) will filter packets received via virtual network device link 360 from being sent virtual link bundle 250(1).

Figure 4A:
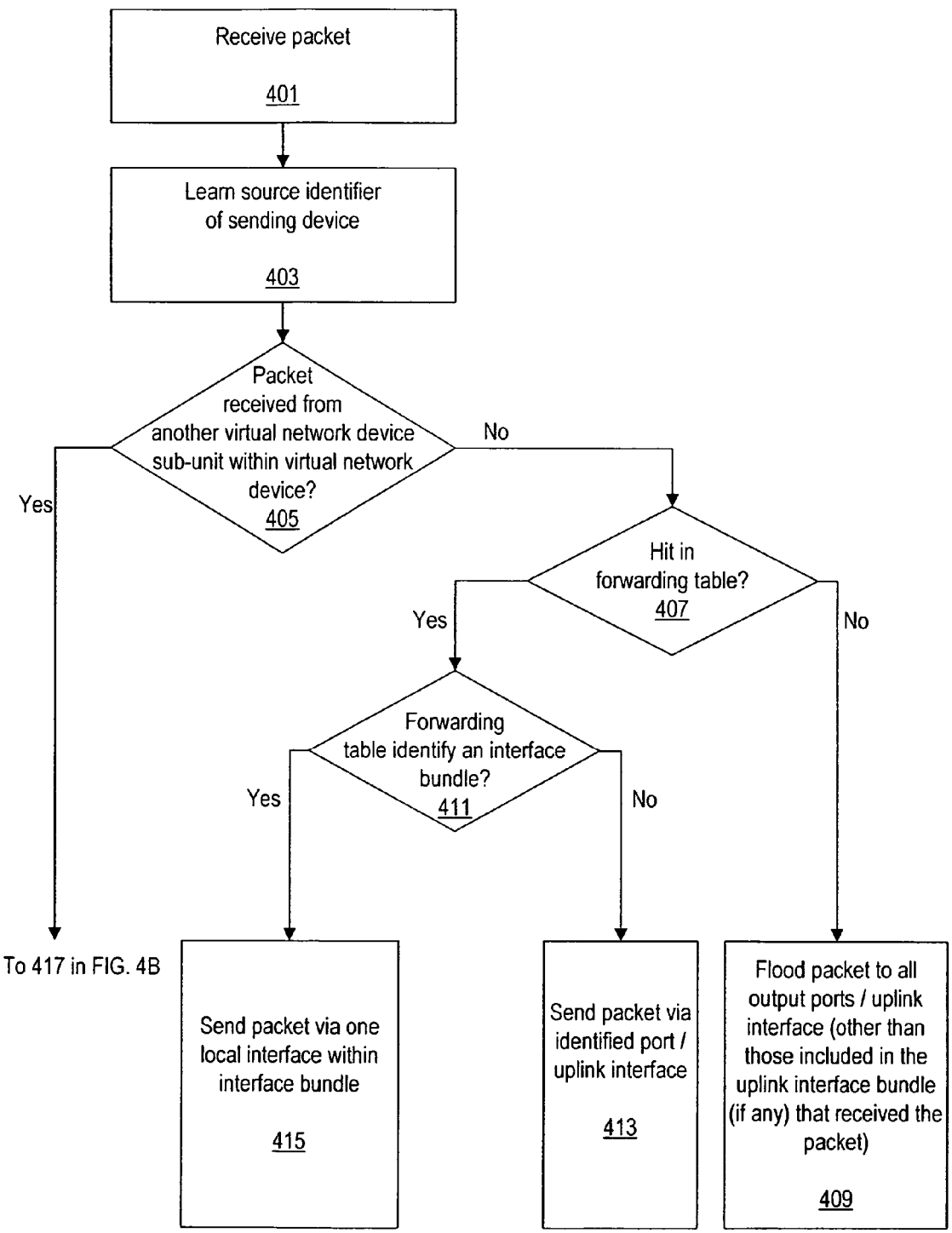
FIGS. 4A-4B show a flowchart of a method of handling data packets received via an interface bundle that spans multiple virtual network device sub-units, according to one embodiment of the present invention.
Figure 4B:
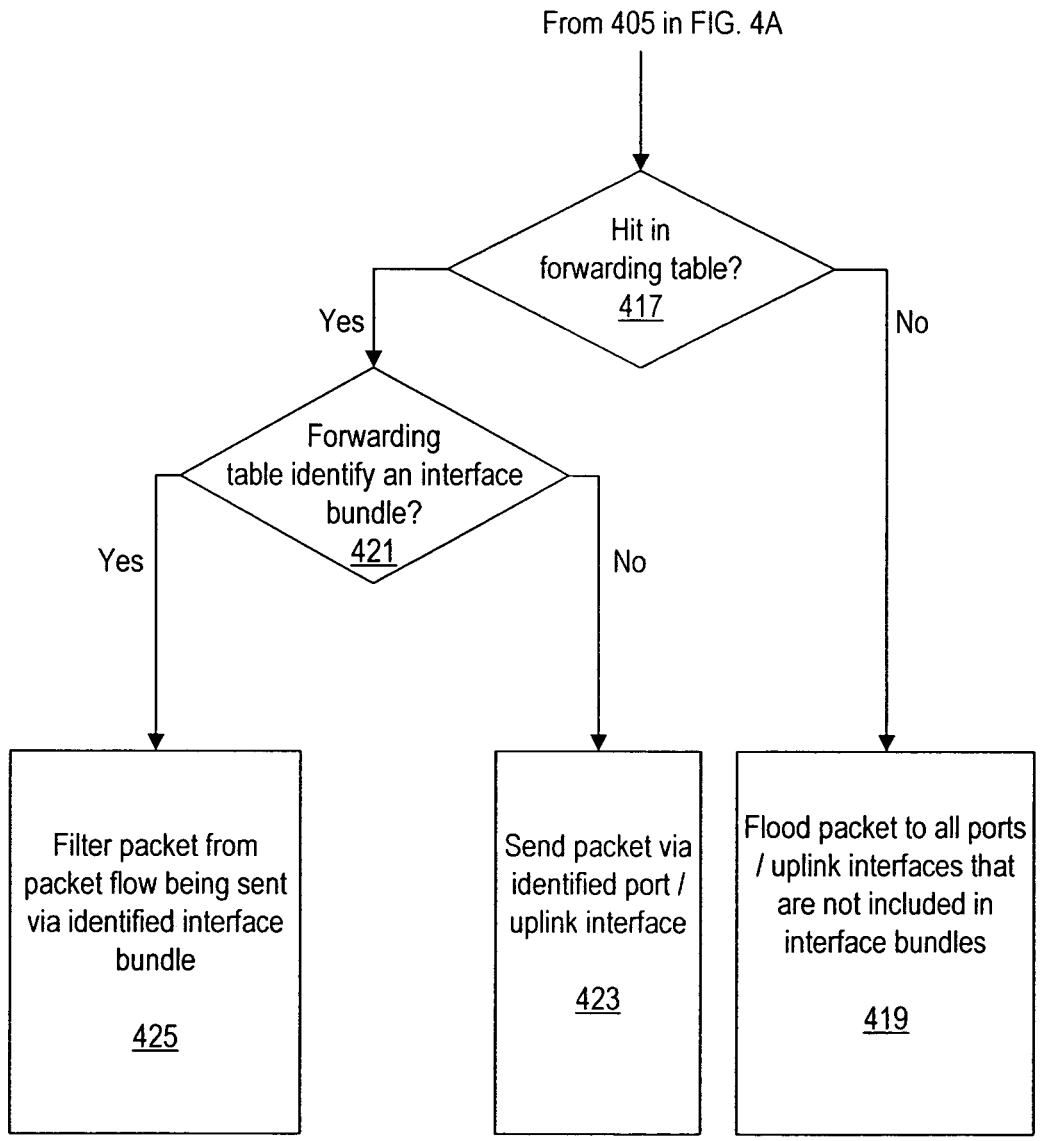

FIGS. 4A-4B show a flowchart of a method implemented by a virtual network device sub-unit that is included within a virtual network device. At 401 of FIG. 4A, a packet is received. Based on the source address of the packet and which port or uplink interface received the packet, the virtual network device sub-unit learns the source identifier of the sending device, as indicated at 403. If the packet is received via a satellite network device or another virtual network device sub-unit within a virtual network device, this source identifier can identify a port or uplink interface in the satellite network device or other virtual network device sub-unit. For example, if the packet is received from another virtual network device sub-unit via a virtual network device link, a header appended to the packet can indicate which of the other virtual network device sub-unit's ports or uplink interfaces received the packet. In some embodiments, the header can indicate which of a satellite network device's ports originally received the packet from the sending device. The virtual network device sub-unit receiving the packet can then learn that the logical identifier of the identified port or uplink interface is associated with the source address of the packet. This source identifier can subsequently be used to forward packets to the sending device.

If the packet is received from a local uplink interface or port (i.e., if the packet is not received from another virtual network device sub-unit within the virtual network device), as determined at 405, the virtual network device sub-unit attempts to forward the packet to its destination address. For example, the virtual network device sub-unit can provide the destination address to a forwarding table in order to determine which logical identifier, if any, is associated with that destination address. If there is no hit in the forwarding table, as determined at 407, the virtual network device sub-unit has not yet learned the logical identifier of the interface(s) in front of the destination device(s). In this situation, the virtual network device sub-unit floods the packet to all egress ports and/or uplink interfaces in the incoming VLAN (Virtual Local Area Network) (the incoming VLAN is the VLAN that includes the device identified by the packet's source address), excluding the interface that the packet arrived on, as shown at 409. For interfaces (e.g., ports or uplinks) included in interface bundles, the virtual network device sub-unit selects one egress interface per interface bundle via which to send the packet. If the packet was received by the virtual network device sub-unit via an interface bundle, all interfaces in that interface bundle are excluded from sending the packet.

If the packet's destination address hits in the forwarding table, as determined at 407, the virtual network device sub-unit uses the logical identifier returned by the forwarding table to select the interface(s) to which the packet should be sent. If the forwarding table does not identify an interface bundle, as determined at 411, the packet is sent via the identified port(s) and/or uplink interface(s), as indicated at 413. If the forwarding table does identify an interface bundle, the virtual network device sub-unit sends the packet via one local interface included within the identified interface bundle, as shown at 415 (if the forwarding table identifies other non-interface-bundle interfaces, the packet is sent via those interfaces as well).

FIG. 4B shows the manner in which the virtual network device sub-unit handles the packet if the packet is received from another virtual network device sub-unit via a virtual network device link (as determined at 405 of FIG. 4A). In this situation, if the packet should be forwarded via any interface bundles, the first virtual network device sub-unit to have handled the packet will have already sent the packet on a link within that interface bundle (assuming normal operation without any failures).

The virtual network device sub-unit determines whether that sub-unit has already learned the logical identifier associated with the packet's destination device. In this example, this is performed by providing the destination address to a forwarding table, as shown at 417. If there is not a hit in the forwarding table (i.e., if no association has already been learned for the destination address), the virtual network device sub-unit floods the packet on the incoming VLAN. This is performed at 419 by sending the packet via all ports and uplink interfaces that are not included in interface bundles. Interface bundles are excluded because the first virtual network device sub-unit to handle the packet will have already sent a copy of the packet via a egress interface in each interface bundle.

If there is a hit in the forwarding table, and if the forwarding table does not identify an interface bundle at 421, the packet is sent via the identified port and/or uplink interfaces, as indicated at 423. If instead the forwarding table does identify an interface bundle, the packet is not sent via that interface bundle. For example, as shown at 425, the packet can be filtered from the packet flow being sent via the identified interface bundle. The packet is not sent via the interface bundle because the packet was received via the virtual network device link, indicating that another virtual network device sub-unit has already sent the packet via the identified interface bundle. In some embodiments, function 425 is performed by the egress interface selected from that interface bundle. A header appended to the packet includes information indicating that the packet was received via the virtual network device link. For example, each egress interface included in an interface bundle is configured to filter packets having this header from the packet flow being sent via that egress interface.

FIGS. 5A-5F show how a packet is conveyed via a virtual network device when the virtual network device does not already know the port identifier of the destination device. In this example, satellite network devices, which operate as line cards of the virtual network device 202, are coupled between clients 102(1) and 102(2) and virtual network device 202. Ports on these satellite network devices are identified using logical identifiers assigned by virtual network device 202. For example, in this example, virtual network device 202 has assigned a port within satellite network device 520(1) the logical identifier "P1" and has assigned a port within satellite network device 520(2) the logical identifier "P2". Since virtual network device 202 controls satellite network devices 520(1) and 520(2) as line cards of virtual network device 202, virtual network device 202 views ports P1 and P2 as local ports.

Figure 5A:
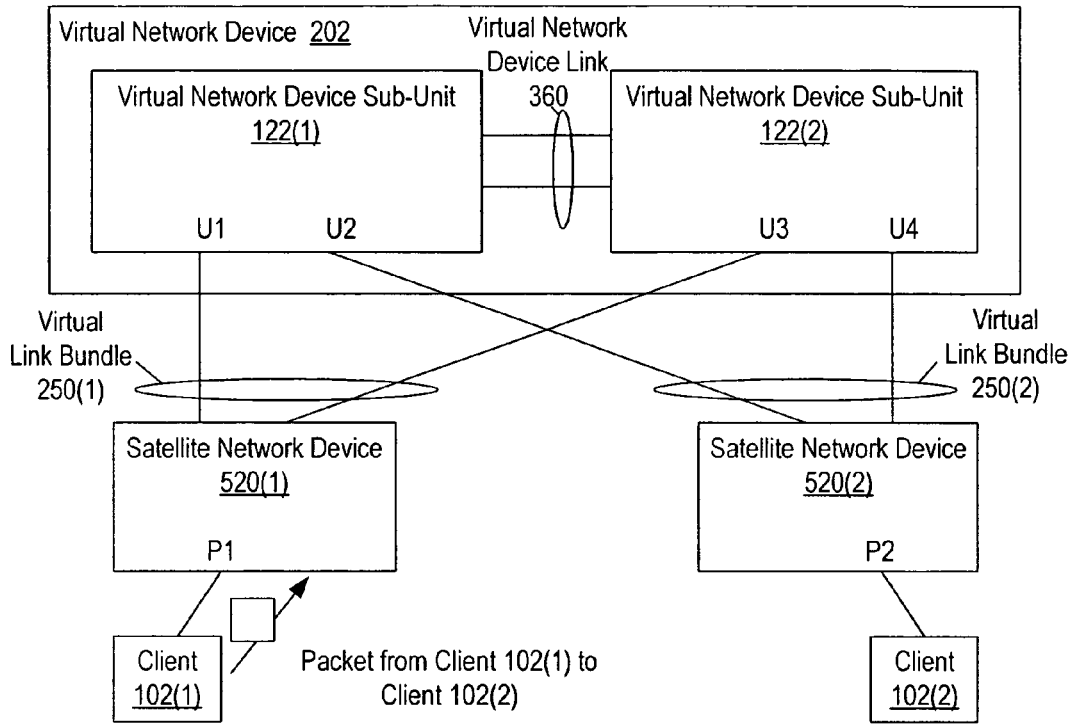
FIGS. 5A-5F show how a packet is handled if the virtual network device does not already know the logical identifier of the destination device, according to one embodiment of the present invention.

As shown in FIG. 5A, virtual network device 202 includes two virtual network device sub-units 122(1) and 122(2). Virtual network device sub-unit 122(1) includes uplink interfaces U1 and U2, while virtual network device sub-unit 122(2) includes uplink interfaces U3 and U4. Two satellite network devices 520(1) and 520(2) are coupled to communicate with virtual network device 202. Satellite network device 520(1) communicates with virtual network device 202 via virtual link bundle 250(1). Satellite network device 520(2) communicates with virtual network device 202 via virtual link bundle 250(2). Virtual link bundle 250(1) and virtual link bundle 250(2) each include one uplink that is coupled to virtual network device sub-unit 122(1) and another uplink that is coupled to virtual network device sub-unit 122(2).

In FIG. 5A, client 102(1) sends a packet, which is addressed to client 102(2), to satellite network device 520(1). Satellite network device 520(1) receives the packet via port P1. In this example, satellite network device 520(1) selects one of the uplinks in virtual link bundle 250(1) upon which to send the packet to virtual network device 202. Satellite network device 520(1) can send the packet to virtual network device 202 based on the destination address included in the packet (e.g., in an embodiment in which satellite network device 520(1) performs local forwarding) or as a matter of course (e.g., in an embodiment in which satellite network device 520(1) does not perform any local forwarding, satellite network device 520(1) forwards all packets to virtual network device 202 for routing and forwarding). If satellite network device 520(1) performs local forwarding, satellite network device 520(1) can also learn that client 102(1) is behind port P1 (e.g., by storing information associating the packet's source address with port P1 in a lookup table).

Figure 5B:
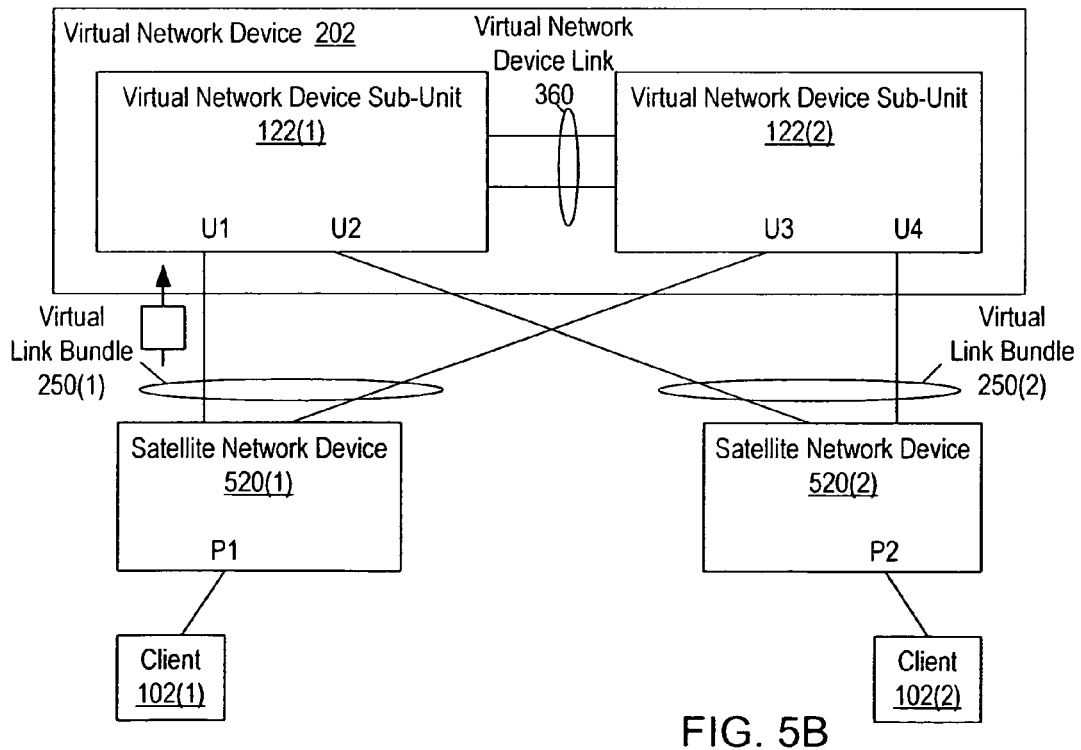

As shown in FIG. 5B, satellite 520(1) selects to send the packet to virtual network device 202 via the uplink connected to virtual network device sub-unit 122(1). This selection can be based on load-sharing considerations. In many embodiments, the selection of the uplink is made without any knowledge of which uplink connects to which virtual network device sub-unit within virtual network device 202. For example, in such an embodiment, satellite device 520(1) does not maintain any state information or other information useable to differentiate between the uplinks based on the virtual network device sub-unit to which each uplink is coupled. Thus, the selection of an uplink interface can be based on other considerations.

In this example, satellite network device 520(1) appends a header to the packet before forwarding the packet on the selected uplink. This header identifies the port, P1, of satellite network device 520(1) via which the packet was received from client 102(1).

Figure 5C:
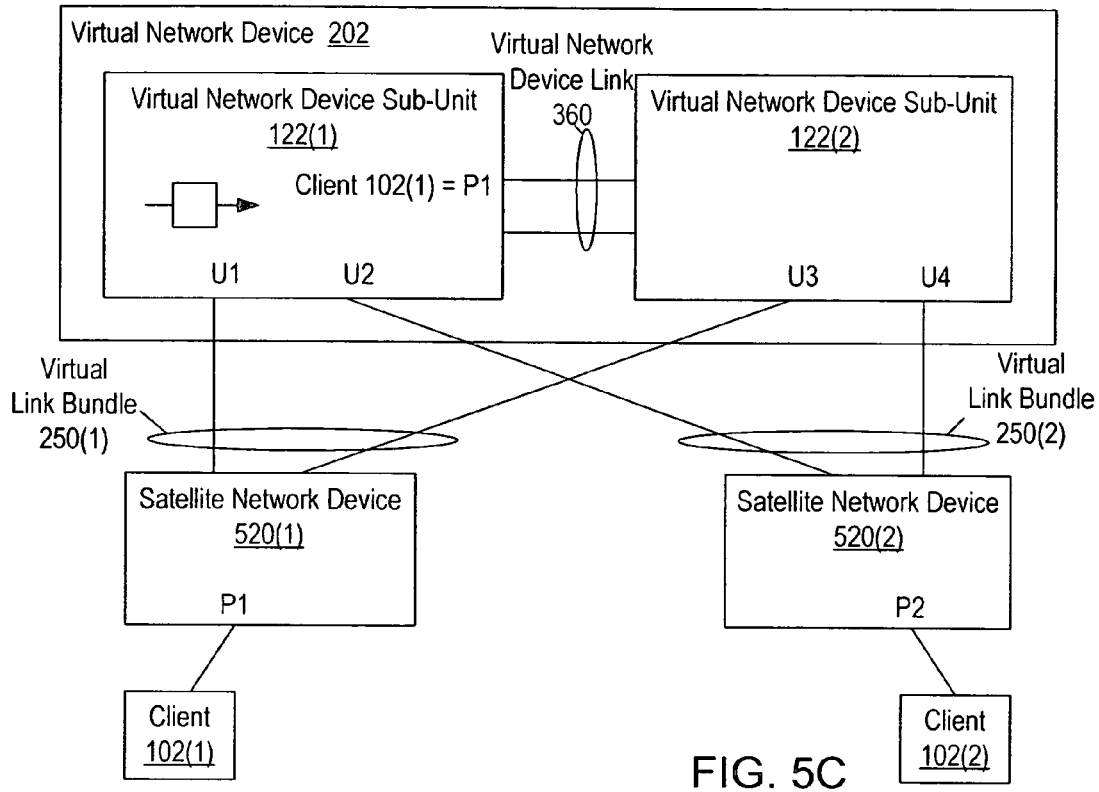

In FIG. 5C, virtual network device sub-unit 122(1) receives the packet via uplink interface U1. Based on the appended header, virtual network device sub-unit 122(1) learns that client 102(1) is behind port P1 of satellite network device 520(1) (as mentioned above, in this embodiment, virtual network device sub-unit 122(1) operates satellite network device 520(1) as a virtual line card and thus sees port P1 as a local port).

Virtual network device sub-unit 122(1) looks up the destination address of the packet in a forwarding table to determine how to forward the packet to client 102(2). In this example, network device 122(1) does not know which port is associated with client 102(2), and thus the lookup returns a flood identifier, causing virtual network device sub-unit 122(1) to flood the packet in the incoming VLAN (the incoming VLAN is the VLAN that includes client 102(1)).

Virtual network device link 360 and uplink interface bundles 250(1) and 250(2) are selected by the flood index. Since the packet was received via an uplink interface in uplink interface bundle 250(1), virtual network device sub-unit 122(1) filters the packet from the packet flow being sent via uplink interface U1 (it is noted that in alternative embodiments, the packet is sent back to satellite network device 520(1) via uplink U1 and satellite network device 520(1) then filters the packet from the packet flow being sent to client 102(1) via port P1).

Figure 5D:
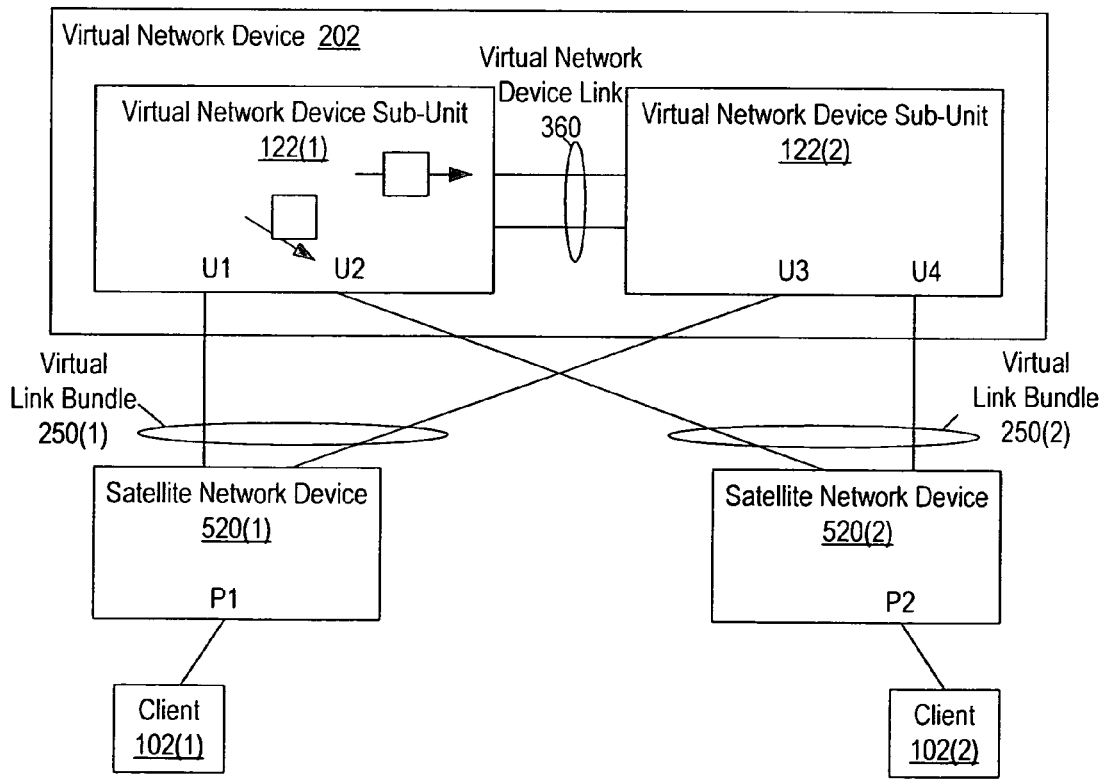

Thus, as shown in FIG. 5D, the packet is output via one of the links included in virtual network device link 360 and via uplink interface U2. In this example, a header is appended to the copy of the packet output via uplink interface U2. The header identifies the port(s) within network device 520(2) via which the packet should be output. Since the packet is being flooded, this header can include a flood identifier that selects an appropriate group of one or more ports (e.g., all ports in the VLAN in which the packet was originally received). Similarly, a header identifying the flood identifier can be appended to the copy of the packet sent via virtual network device link 360. The header appended to this copy of the packet can also include the identifier of the uplink interface bundle via which the packet was originally received.

Figure 5E:
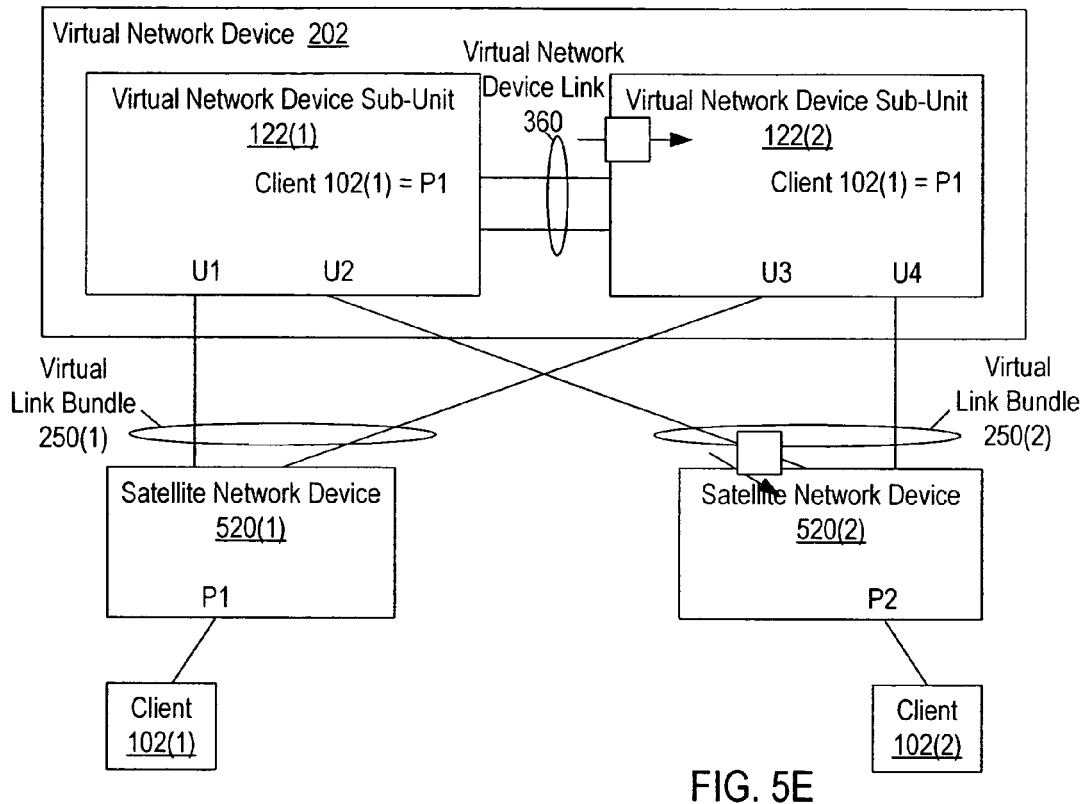

FIG. 5E illustrates how, in response to receiving the copy of the packet via virtual network device link 360, virtual network device sub-unit 122(2) learns that the sending device, client 102(1), is behind port P1 (virtual network device sub-unit 122(2) already knows that port P1 is behind virtual link bundle 250(1)). In this example, all of the interfaces included within virtual network device sub-unit 122(2) are uplink interfaces (i.e., virtual network device sub-unit 122(2) has no locally-attached clients are servers). Since virtual network device sub-unit 122(2) received the packet via virtual network device link 360, virtual network device sub-unit 122(2) knows that the packet has already been forwarded via each uplink interface bundle indicated in the flood identifier. Accordingly, virtual network device sub-unit 122(2) filters the packet from the flows being output via uplink interfaces U3 and U4. In one embodiment, this is performed by hardware in each uplink interface. For example, uplink interface U3 can filter the packet based on a header appended to the packet. If the header indicates that the packet was received via virtual network device link 360, U3 eliminates the packet from the packet flow being sent via U3.

Figure 5F:
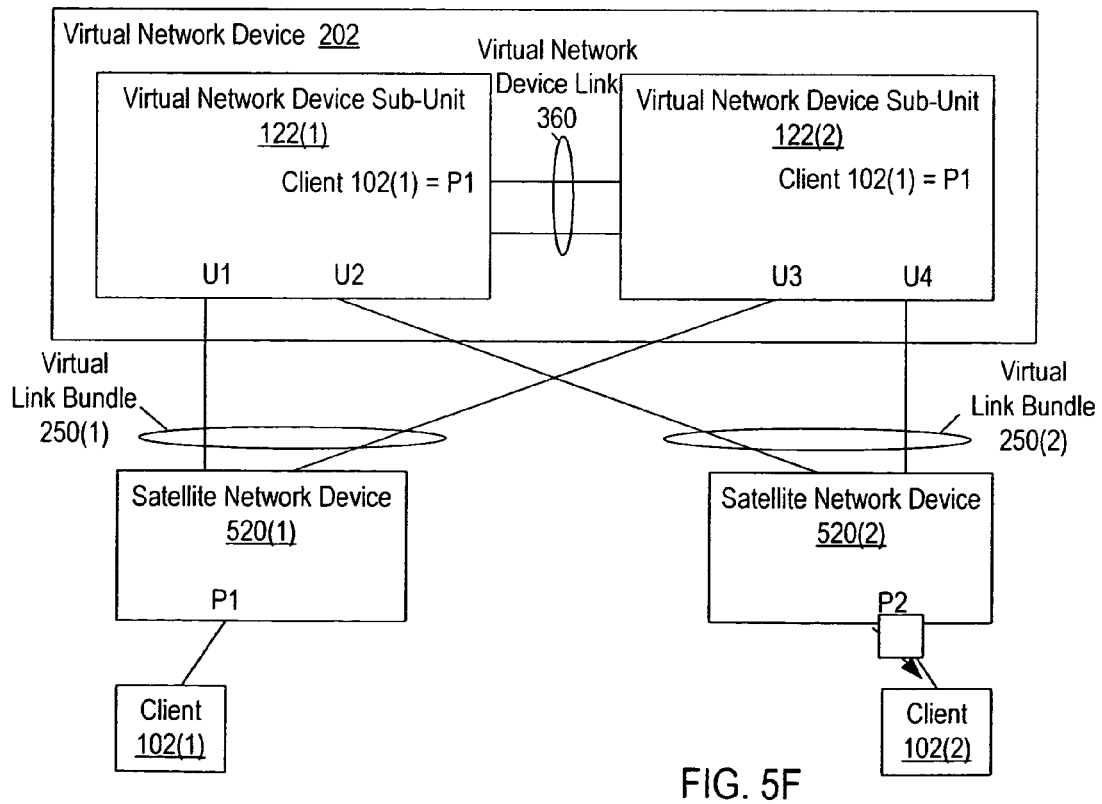

In FIG. 5F, satellite network device 520(2) has output a copy of the packet via all of its ports (here, only port P2 is shown) that are indicated in the flood identifier. Accordingly, the packet is forwarded to its destination device, client 102(2), via port P2 of satellite network device 520(2).

Figure 6A:
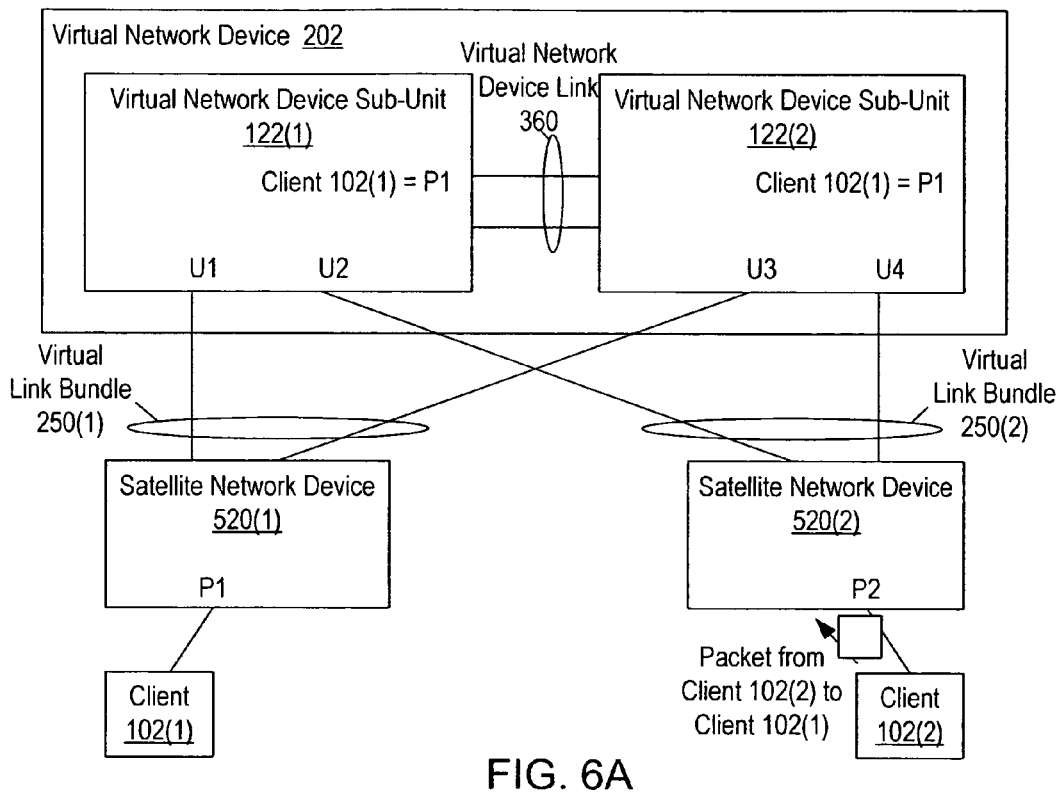
FIGS. 6A-6D show how a packet is handled when the virtual network device already knows the logical identifier of the destination device, according to one embodiment of the present invention.

FIGS. 6A-6D show how a packet is conveyed via the virtual network device of FIGS. 5A-5F when virtual network device 202 already knows the port identifier of the destination device. In this example, client 102(2) sends a packet addressed to client 102(1), as shown in FIG. 6A. Virtual network device sub-units 122(1) and 122(2) in virtual network device 202 each are already aware that client 102(1) is behind port P1 of satellite network device 102(1) before this packet is sent. The packet is received by satellite network device 520(2) via port P2.

Figure 6B:
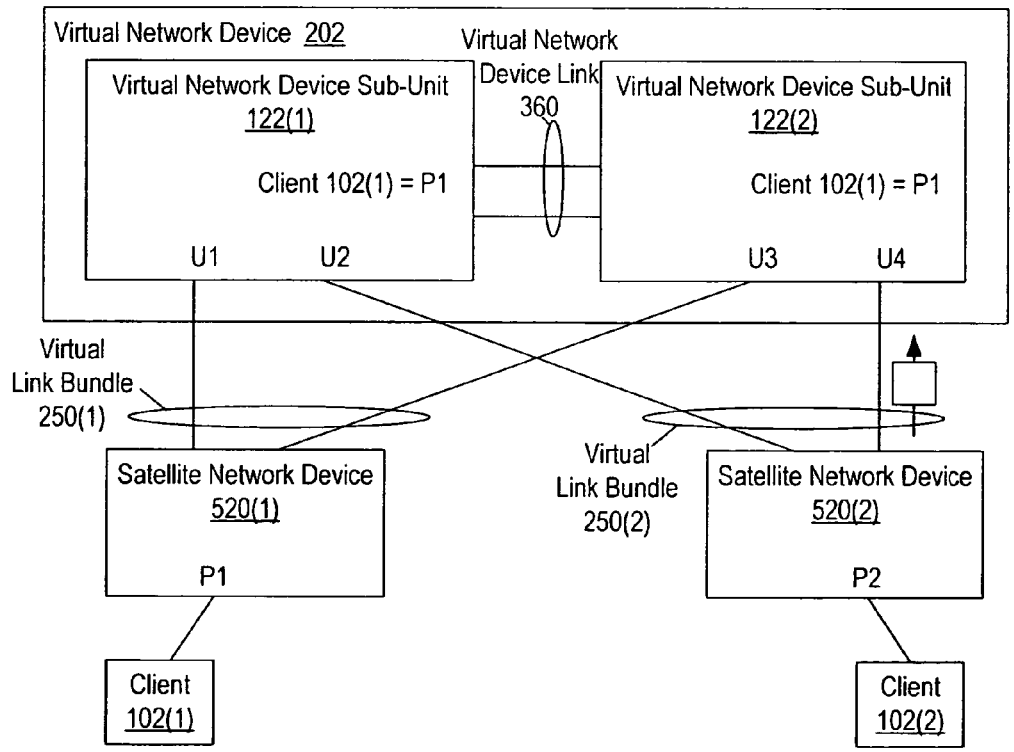

FIG. 6B shows how satellite network device 520(2) sends the packet to virtual network device 202 via virtual link bundle 250(2). Virtual link bundle 250(2) includes two uplinks in this example. Satellite network device 520(2) selects one of the uplinks (e.g., based on load-sharing considerations) within virtual link bundle 250(2). Here, satellite network device 520(2) has selected the uplink coupled to uplink interface U4. Satellite network device 520(2) also appends a header identifying port P2 to the copy of the packet before sending that copy of the packet via the selected uplink.

Figure 6C:
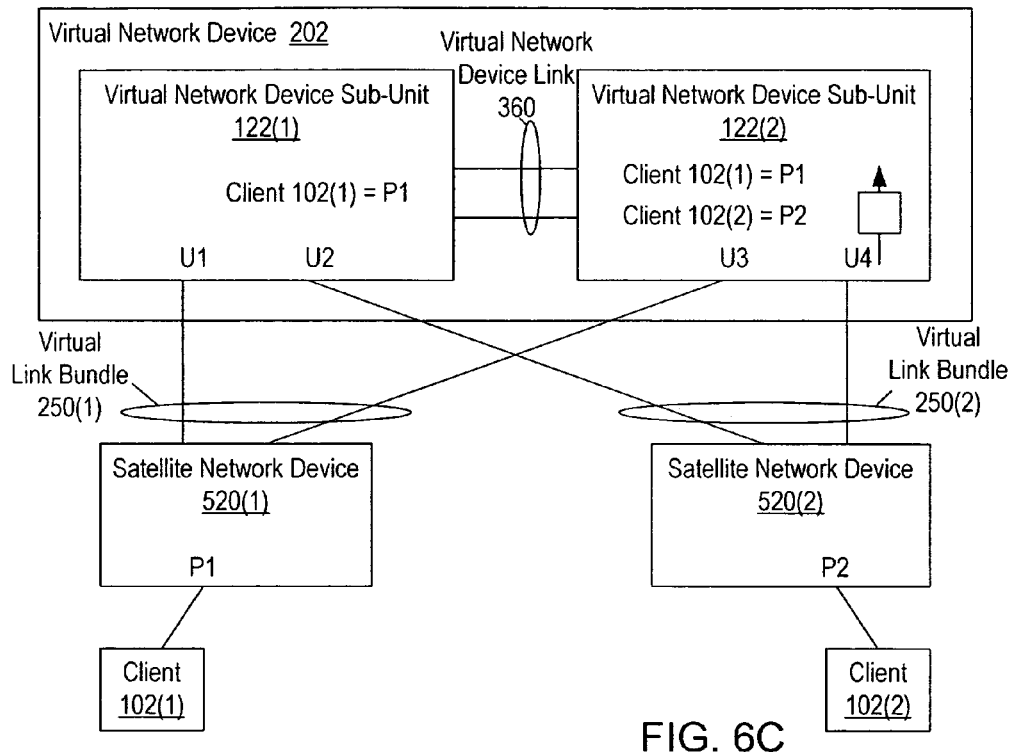
Figure 6D:
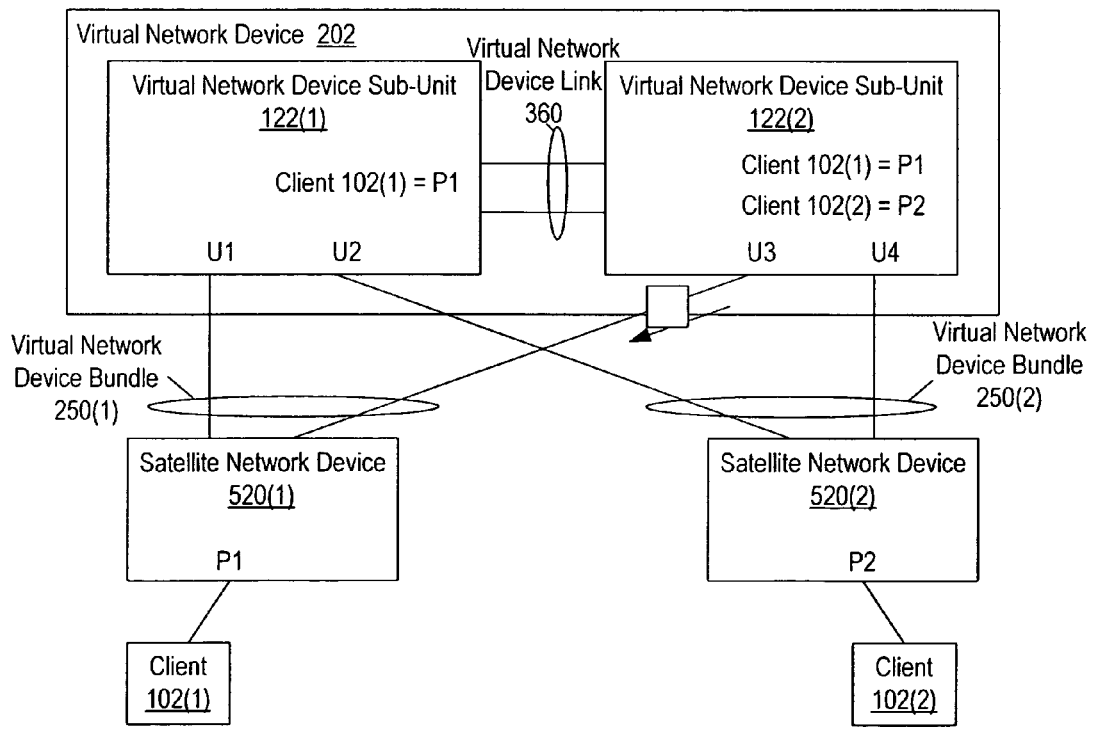

In FIG. 6C, virtual network device sub-unit 122(2) receives the packet from satellite network device 520(2) via uplink interface U4. In response to receiving the header appended to the packet, virtual network device sub-unit 122(2) learns that client 102(2) is behind port P2. Since virtual network device sub-unit 122(2) already knows that the packet's destination, client 102(1), is behind port P1 (e.g., because a lookup table entry associating client 102(1)'s address with port P1 has already been allocated), virtual network device sub-unit 122 (2) forwards the packet to satellite network device 520(1) via virtual link bundle 250(1), as shown in FIG. 6D. In this example, virtual network device sub-unit 122(2) includes a local uplink interface, U3, that is coupled to virtual link bundle 250(1), allowing virtual network device sub-unit 122 (2) to send a copy of the packet to satellite network device 520(1) directly via uplink interface U3, without sending the copy through virtual network device sub-unit 122(1).

FIGS. 7A-7F illustrates another example of how a packet can be conveyed via a virtual network device. In this example, the access-layer network devices 120(1) and 120(2) interposed between clients 102(1) and 102(2) and virtual network device 202 are non-satellite network devices. Thus, network devices 120(1) and 120(2) perform their own routing and forwarding and are not configured by virtual network device 202. Similarly, virtual network device 202 does not view ports of network devices 120(1) and 120(2) as local ports, nor does virtual network device 202 assign port identifiers to ports in network devices 120(1) and 120(2). Additionally, the links included in virtual link bundles 250(1) and 250(2) are not uplinks, and unlike satellite network devices, network devices 120(1) and 120(2) do not append information to packets to specify which local port received each packet before forwarding the packets to virtual network device 202.

Figure 7A:
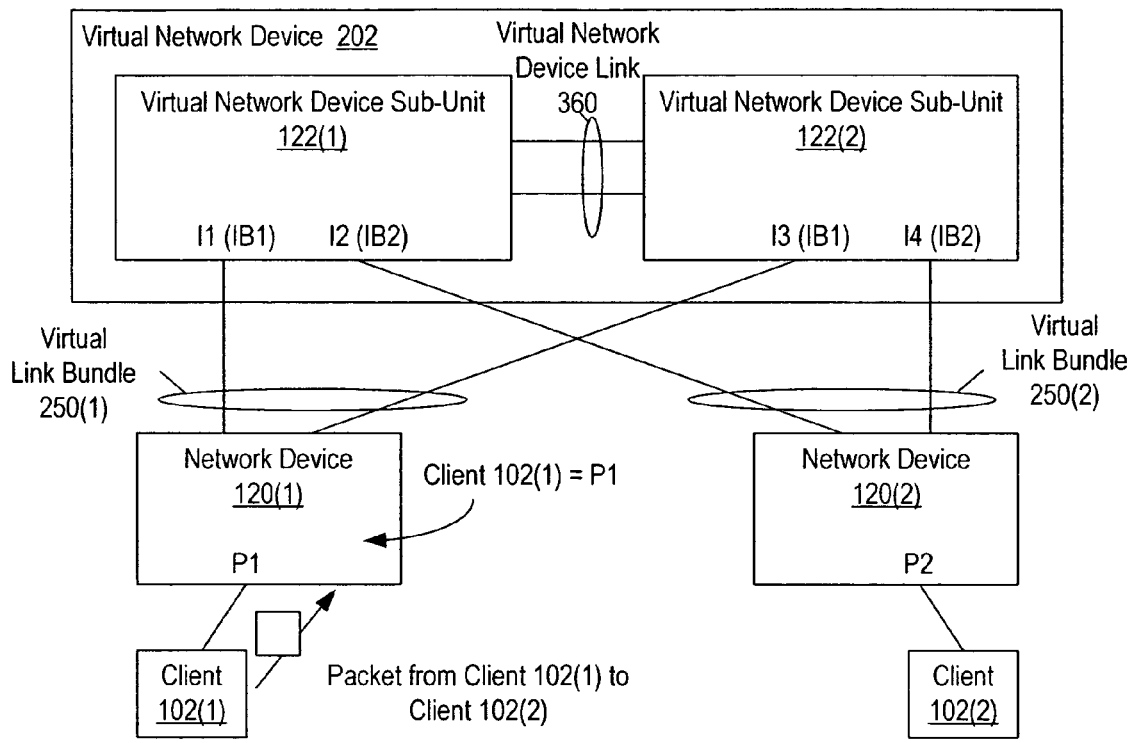
FIGS. 7A-7F show how a packet, received from a non-satellite network device, is handled if the virtual network device does not already know the logical identifier of the destination device, according to one embodiment of the present invention.

As shown in FIG. 7A, network device 120(1) is coupled to virtual network device 202 by virtual link bundle 250(1), while network device 120(2) is coupled to virtual network device 202 by virtual link bundle 250(2). Both virtual link bundles include links that terminate at virtual network device sub-unit 122(1) and links that terminate at virtual network device sub-unit 122(2).

In this example, much like the example of FIGS. 5A-5F, network device 120(1) receives a packet via port P1 from client 102(1) that is addressed to client 102(2). Upon receiving the packet, network device 120(1) learns that client 102(1) is behind port P1. Network device 120(1) determines that the packet should be forwarded to virtual network device 202 and selects one of the links in virtual link bundle 250(1) on which to send the packet to virtual network device 202. The link selection can be performed, for example, by executing a hash-based load-sharing algorithm. In this example, network device 120(1) selects the link coupled to virtual network device sub-unit 122(1).

Figure 7B:
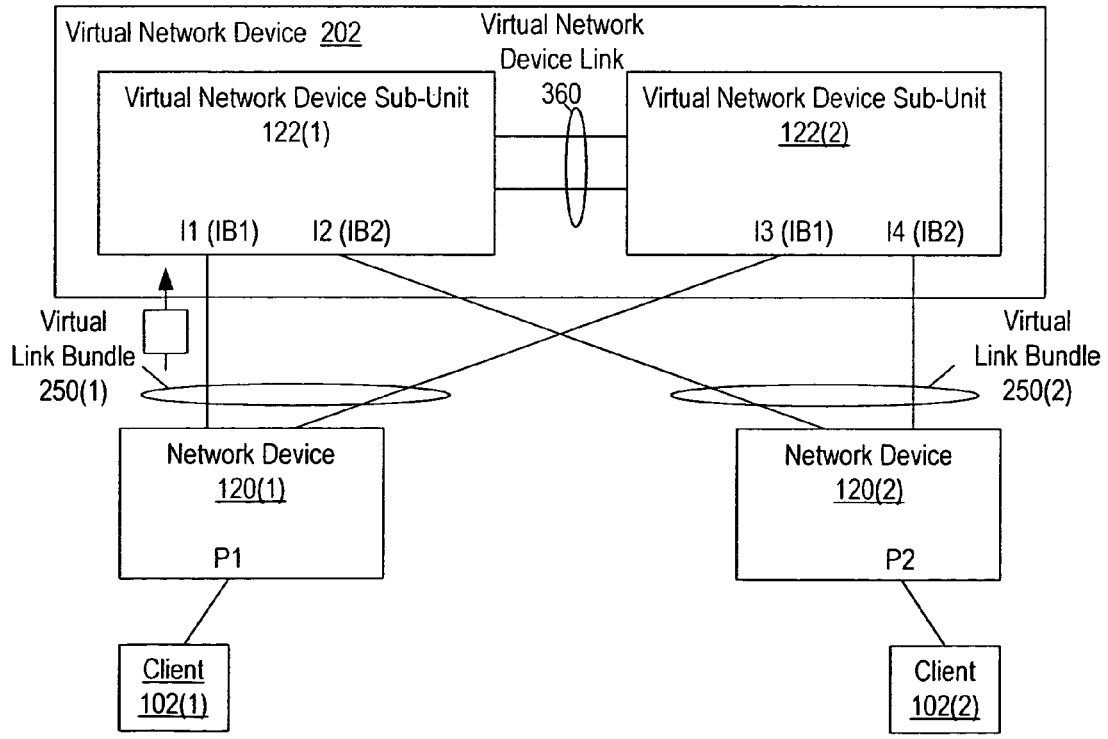

FIG. 7B illustrates how network device 120(1) sends the packet to virtual network device 202 via virtual link bundle 250(1). In particular, network device 120(1) sends the packet via the link coupled to interface I1 of virtual network device sub-unit 122(1). Interface I1 is part of interface bundle IB1, which also includes interface I3 of virtual network device sub-unit 122(2).

Figure 7C:
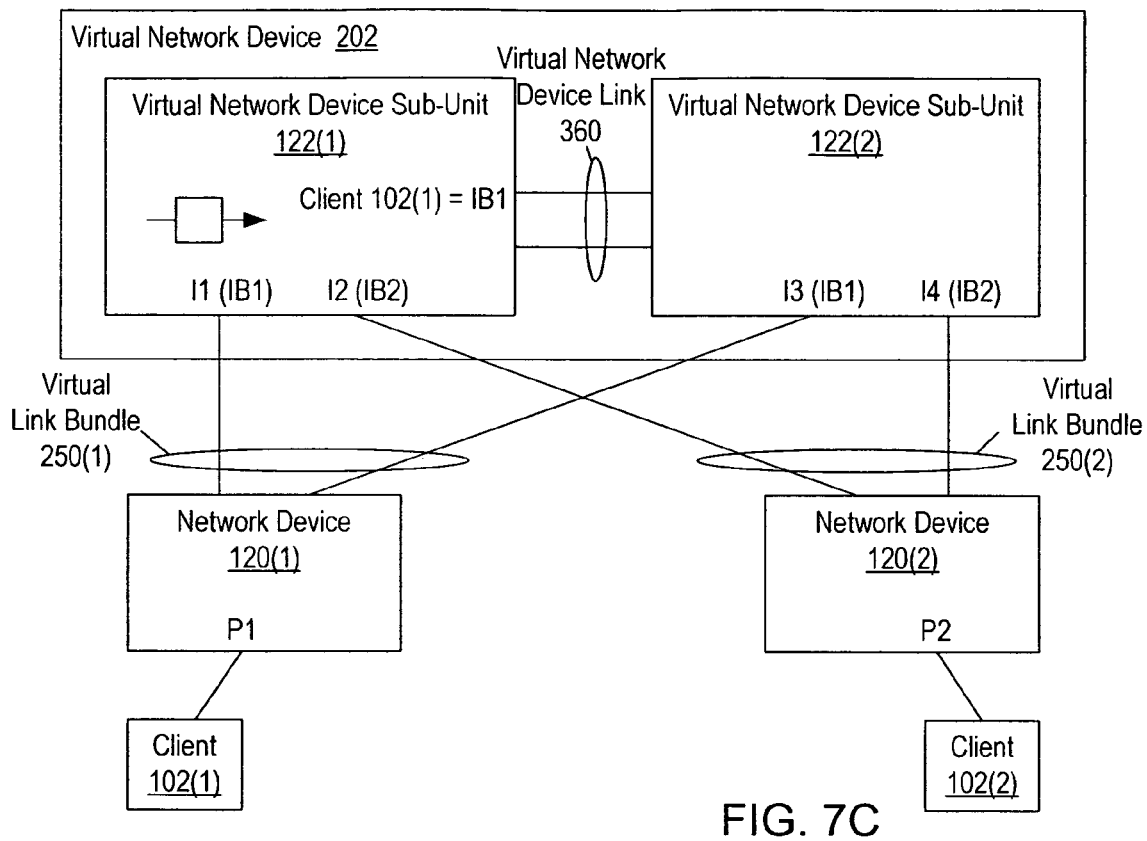

In FIG. 7C, virtual network device sub-unit 122(1) learns that client 102(1) is behind interface bundle IB1 in response to receiving the packet via interface I1. In this example, virtual network device sub-unit 122(1) does not know which interfaces are associated with the packet's destination address. As a result, virtual network device sub-unit 122(1) floods the packet via all egress links.

Figure 7D:
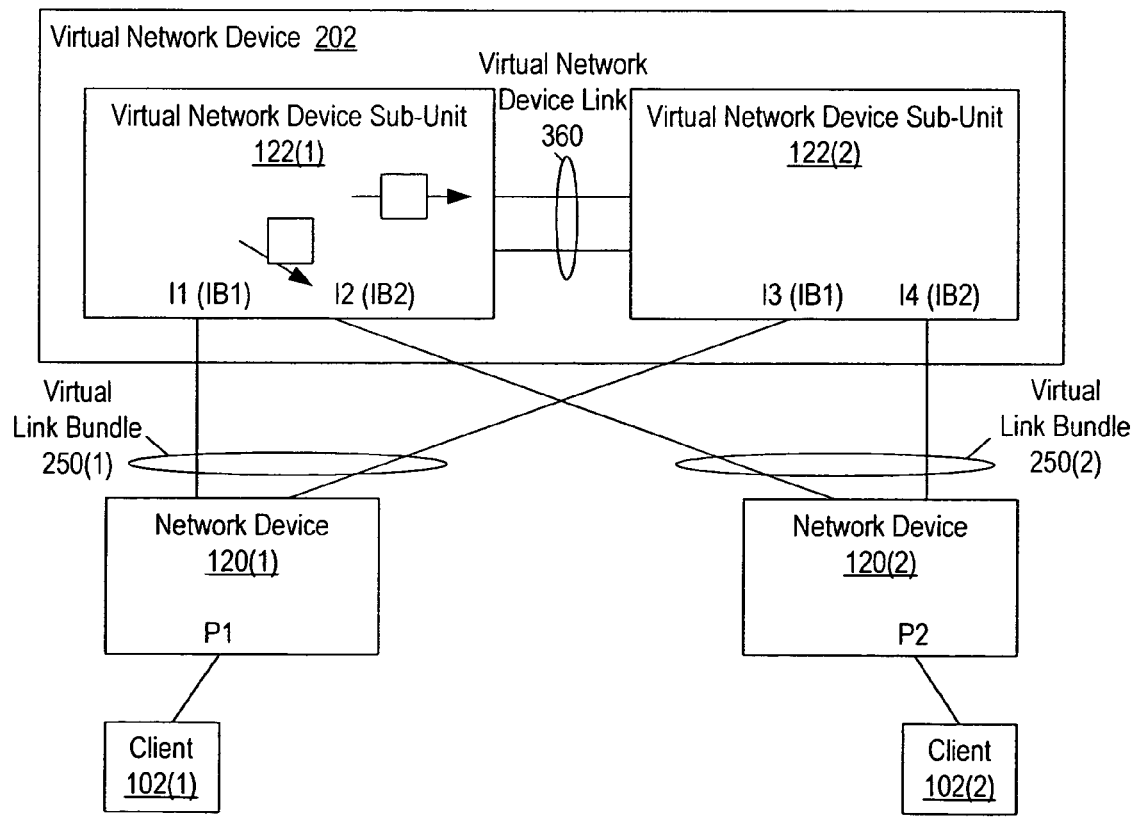

FIG. 7D shows virtual network device sub-unit 122(1) flooding the packet by sending a copy of the packet via virtual network device link 360 and another copy of the packet via interface I2. Sending the packet via interface I2 works to send a copy of the packet to network device 120(2) via virtual link bundle 250(2). Since the packet was received via interface bundle IB1, the packet is not sent via any links in that interface bundle.

Before sending the copy of the packet via virtual network device link 360, virtual network device sub-unit 122(1) appends a header to the packet. The header indicates that the packet was received via interface bundle IB1 (e.g., the header can include the logical identifier used to identify interfaces in interface bundle IB1).

Figure 7E:
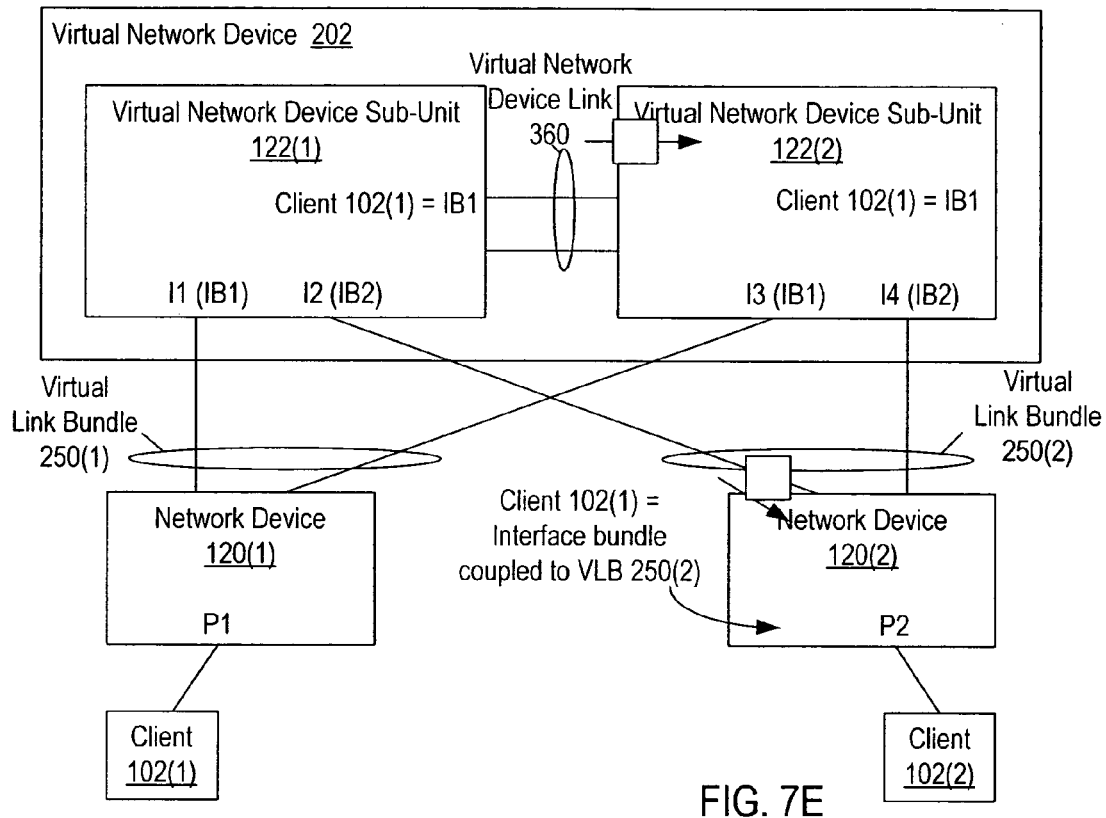

As shown in FIG. 7E, the copy of the packet sent via virtual link bundle 250(2) is received by network device 120(2). Upon receiving the packet, network device 120(2) learns that client 102(1) is behind the interface bundle coupled to virtual link bundle 250(2). This interface bundle includes both interfaces, and thus if network device 120(2) is later handling a packet addressed to client 102(1), network device 120(2) can select either of the links in virtual link bundle 250(2) on which to send the packet.

Figure 7F:
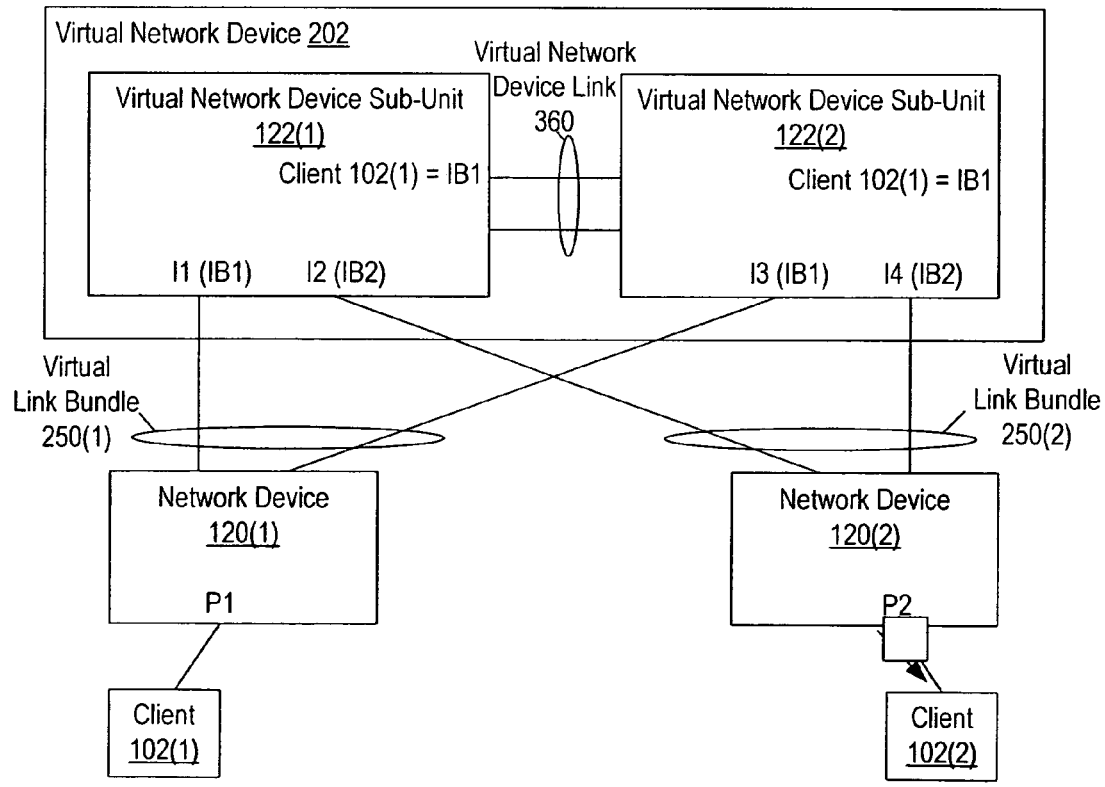

Also, virtual network device sub-unit 122(2) learns that client 102(1) is behind interface bundle IB1 in response to receiving the copy of the packet and appended header via virtual network device link 360. Since virtual network device sub-unit 122(2) also does not know how to forward the packet to the destination address, virtual network device sub-unit 122(2) also floods the packet. However, since the only interfaces in virtual network device sub-unit 122(2) are either interfaces to virtual network device link 360 or interfaces to a virtual link bundle, the packet is filtered out of the outgoing packet flows being sent via those interfaces. This is because the packet has already been handled by virtual network device sub-unit 122(1), and thus there is no need to forward a copy of the packet back to virtual network device sub-unit 122(1) via virtual network device link 360, nor is there any need to send additional copies of the packet via the virtual network device links. In FIG. 7F, network device 120(2) sends the packet via port P2, which is coupled to the packet's destination, client 102(2).

It is noted that a system such as the one shown in FIGS. 7A-7F can also handle packets when virtual network device 202 already knows the appropriate interface bundle via which to forward the packet. In such a situation, the packet can be forwarded through the system in nearly the same manner shown in FIGS. 6A-6D. However, instead of forwarding the packet based on knowing that the destination device is behind a particular satellite network device port, the virtual network device sub-units forward the packet based on their knowledge that the destination device is behind a particular interface bundle.

It is noted that in some embodiments, the functionality needed to use a virtual link bundle is implemented in software executing on the virtual network device sub-unit, network device, and/or satellite network device coupled to the virtual link bundle. For example, each virtual network device sub-unit, network device, and/or satellite network device can include a computer readable media upon which program instructions and/or data useable to control and/or use a virtual link bundle are stored. Exemplary types of computer readable media include CDs (Compact Discs), DVDs (Digital Versatile Discs), hard disks, optical disks, tape devices, floppy disks, and memory (e.g., various types of RAM (Random Access Memory), ROM (Read Only Memory), flash memory, MEMS (Micro Electro-Mechanical Systems) memory, and the like). Such a network device can include one or more processors (e.g., microprocessors, PLDs (Programmable Logic Devices), or ASICs (Application Specific Integrated Circuits)) configured to execute program instructions stored in the computer readable media. The program instructions can include those used to perform control protocol processing for a virtual link bundle as well as those used to selectively forward packets via links included in a virtual link bundle (e.g., based on whether the packets were received via a virtual network device link). The program instructions and/or data can also be transferred to a virtual network device sub-unit, network device, and/or satellite network device via a network such as the Internet or upon a carrier medium. In some embodiments, a computer readable medium is a carrier medium such as a network and/or a wireless link upon which signals such as electrical, electromagnetic, or digital signals, on which the data and instructions are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A system comprising:
    a virtual link bundle comprising a first plurality of communication links, wherein
        the first plurality of communication links is configured to couple a virtual network device to a first network device external to the virtual network device,
        the first virtual network device operates in a distribution layer,
        a first end of each of the first plurality of communication links is configured to be coupled to the first network device,
        a second end of a first one of the first plurality of communication links is configured to be coupled to a first virtual network device sub-unit within the virtual network device,
        a second end of a second one of the first plurality of communication links is configured to be coupled to a second virtual network device sub-unit within the virtual network device,
        the first virtual network device sub-unit is coupled to the second virtual network device sub-unit via a virtual network device link,
        the first network device comprises a first plurality of ports,
        each of the first plurality of ports is configured to communicate packets with a respective client,
        the first network device is configured to append a header to a packet before sending the packet to the virtual network device via one of the first plurality of communication links, and
        the header identifies a one of the first plurality of ports having received the packet,
        the first plurality of communication links provides redundant connections between the first network device and the virtual network device; and
    a second virtual link bundle comprising a second plurality of communication links, wherein
        the second plurality of communication links is configured to couple the virtual network device to a second network device external to the virtual network device,
        a first end of each of the second plurality of communication links is configured to be coupled to the second network device,
        a second end of a first one of the second plurality of communication links is configured to be coupled to the first virtual network device sub-unit within the virtual network device,
        a second end of a second one of the second plurality of communication links is configured to be coupled to the second virtual network device sub-unit within the virtual network device,
        the second network device comprises a second plurality of ports,
        the second plurality of communication links provides redundant connections between the second network device and the virtual network device,
        the first network device and the second network device operate in an access layer,
        the first network device and the second network device are satellite network devices which do not perform layer two forwarding or layer three routing,
        the first plurality of communication links and the second plurality of communication links are uplinks,
        the second virtual network device sub-unit is configured to
            disable transmission of the second packet via the virtual link bundle in response to determining that the second packet was received via the virtual network device link,
            detect a failure of all links of the virtual link bundle coupled to the second virtual network device sub-unit, and
            enable transmission of the second packet via the virtual link bundle in response to the failure.

2. The system of claim 1, further comprising the first network device, wherein
    the first network device is configured to select a communication link of the first plurality of communication links on which to send a particular packet.

3. The system of claim 2, wherein
    each packet sent between the virtual network device and the first network device is sent via only a one of the first plurality of communication links.

4. The system of claim 1, further comprising the first virtual network device sub-unit, wherein
    the first virtual network device sub-unit is configured to identify whether a one of the first plurality of communication links is coupled to another virtual network device sub-unit within the virtual network device.

5. The system of claim 1, further comprising the first virtual network device sub-unit and the second virtual network device sub-unit, wherein the first virtual network device sub-unit and the second virtual network device sub-unit are configured to communicate packets with each other via the virtual network device link.

6. The system of claim 1, wherein
the first plurality of communication links are configured to be managed as a single link.

7. The system of claim 1, wherein
the first virtual network device sub-unit comprises:
a first interface; and
a controller coupled to the first interface and configured to forward packets received via the first interface, wherein
the first interface is identified by a first logical identifier,
a second interface is identified by the first logical identifier,
an interface bundle comprises the first interface and the second interface,
the second interface is comprised in the second virtual network device sub-unit,
the controller is configured to detect whether a third packet was received via the virtual network device link,
a first end of the virtual network device link is configured to be coupled to the first virtual network device sub-unit,
a second end of the virtual network device link is configured to be coupled to the second virtual network device sub-unit, and
the first interface is configured to filter out the third packet from a packet flow being sent via the first interface if the third packet was received via the virtual network device link.

8. The system of claim 7, wherein
the first virtual network device sub-unit is configured to maintain consistent forwarding information with the second virtual network device sub-unit.

9. The system of claim 8, wherein
the controller is configured to perform control protocol processing for the first interface according to a routing protocol running on the interface bundle,
the controller is configured to provide information generated when performing the control protocol processing to a secondary controller comprised in the second virtual network device sub-unit, and
the secondary controller is configured to use the information to manage the second interface.

10. The system of claim 7, wherein
the controller is configured to lookup a destination address of the first packet in a lookup table, and
if the lookup table returns the first logical identifier, the first virtual network device sub-unit is configured to prioritize sending the first packet via the first interface over sending the first packet via the second interface.

11. The system of claim 10, wherein
if the lookup table returns the first logical identifier, the first virtual network device sub-unit is configured to send the first packet via the first interface instead of sending the packet via the second interface, unless one or more of the first interface and a link coupled to the first interface are failed.

12. The system of claim 11, wherein
the first virtual network device sub-unit comprises a plurality of interfaces,
more than one of the interfaces are each comprised in the interface bundle, and
the more than one of the interfaces comprises the first interface.

13. The system of claim 12, wherein
if each respective communication link coupled to the more than one of the interfaces fails, the first virtual network device sub-unit is configured to forward the first packet via the second interface comprised in the second virtual network device sub-unit.

14. The system of claim 7, wherein
the first virtual network device sub-unit is configured to learn that a source address of a second packet is behind the first interface, in response to receiving the second packet via the virtual network device link.

15. The system of claim 1, wherein
the first network device is configured to use a hash-based load-sharing algorithm to select one of the first plurality of communication links comprised in the virtual link bundle, and
the first network device is configured to send a packet via the selected one of the first plurality of communication links.

16. The system of claim 1, wherein
a primary controller comprised in the first virtual network device sub-unit is configured to perform control protocol processing for the first interface according to a routing protocol running on the virtual link bundle,
the primary controller is configured to send information generated by performing the control protocol processing to a secondary controller comprised in the second virtual network device sub-unit, and
the secondary controller is configured to use the information to manage the second interface.

17. A method comprising:
sending a first packet via a first link of a virtual link bundle if a destination identifier associated with the first packet is associated with the virtual link bundle, wherein
the virtual link bundle comprises a first plurality of communication links,
the first plurality of communication links is configured to couple a virtual network device to a first network device external to the virtual network device,
the first virtual network device operates in a distribution layer,
a first end of each of the first plurality of communication links is configured to be coupled to the first network device,
a second end of a first one of the first plurality of communication links is configured to be coupled to a first virtual network device sub-unit within the virtual network device,
a second end of a second one of the first plurality of communication links is configured to be coupled to a second virtual network device sub-unit within the virtual network device,
the first virtual network device sub-unit is coupled to the second virtual network device sub-unit via a virtual network device link,
the first network device comprises a first plurality of ports,
each of the first plurality of ports is configured to communicate packets with a respective client,
the first network device is configured to append a header to the first packet before sending the first packet to the virtual network device via one of the first plurality of communication links, and
the header identifies a one of the first plurality of ports having received the packet, the first plurality of communication links provides redundant connections between the first network device and the virtual network device; and sending a second packet via a second link of a second virtual link bundle if a second destination identifier associated with the second packet is associated with the second virtual link bundle, wherein the second virtual link bundle comprises a second plurality of communication links, the second plurality of communication links is configured to couple the virtual network device to a second network device external to the virtual network device, a first end of each of the second plurality of communication links is configured to be coupled to the second network device, a second end of a first one of the second plurality of communication links is configured to be coupled to the first virtual network device sub-unit within the virtual network device, a second end of a second one of the second plurality of communication links is configured to be coupled to the second virtual network device sub-unit within the virtual network device, the second network device comprises a second plurality of ports, the second plurality of communication links provides redundant connections between the second network device and the virtual network device, the first network device and the second network device operate in an access layer, the first network device and the second network device are satellite network devices which do not perform layer two forwarding or layer three routing, the first plurality of communication links and the second plurality of communication links are uplinks, the second virtual network device sub-unit is configured to disable transmission of the second packet via the virtual link bundle in response to determining that the second packet was received via the virtual network device link, detect a failure of all links of the virtual link bundle coupled to the second virtual network device sub-unit, and enable transmission of the second packet via the virtual link bundle in response to the failure.

18. The method of claim 17, further comprising:
selecting the first one of the first plurality of communication links comprised in the virtual link bundle, wherein the selecting comprises performing a hash-based algorithm.

19. The method of claim 17, further comprising:
receiving a third packet, wherein a destination identifier for the third packet identifies an interface bundle, and the interface bundle comprises a first interface; and detecting whether the third packet was received via the virtual network device link, wherein a first end of the virtual network device link is coupled to the first virtual network device sub-unit, a second end of the virtual network device link is coupled to the second virtual network device sub-unit;

filtering out the third packet from a packet flow being sent via the first interface if the third packet was received via the virtual network device link.

20. The method of claim 19, further comprising:
sending the third packet via the first interface if the third packet was not received via the virtual network device link.

21. The method of claim 20, further comprising:
maintaining consistency between a lookup table comprised in the first virtual network device sub-unit and a second lookup table comprised in the second virtual network device sub-unit.

22. The method of claim 20, further comprising
performing control protocol processing for the interface bundle at a primary controller comprised in the first virtual network device sub-unit, wherein the first interface is comprised in the first virtual network device sub-unit.

23. The method of claim 22, further comprising:
managing a second interface of the second virtual network device sub-unit in response to information generated by the performing the control protocol processing, wherein the second interface is comprised in the interface bundle.

24. The method of claim 23, further comprising:
looking up a destination address of the third packet in a lookup table, and if the lookup table returns the destination identifier, sending the third packet via the first interface of the first virtual network device sub-unit instead of sending the third packet via the second interface of the second virtual network device sub-unit.

25. The method of claim 19, further comprising:
learning that a source address of the third packet is behind a local interface, in response to receiving the third packet via the virtual network device link.

26. A system comprising:
means for sending a first packet via a first link of a virtual link bundle if a destination identifier associated with the first packet is associated with the virtual link bundle, wherein the virtual link bundle comprises a first plurality of communication links, the first plurality of communication links is configured to couple a virtual network device to a first network device external to the virtual network device, the first virtual network device operates in a distribution layer, a first end of each of the first plurality of communication links is configured to be coupled to the first network device, a second end of a first one of the first plurality of communication links is configured to be coupled to a first virtual network device sub-unit within the virtual network device, a second end of a second one of the first plurality of communication links is configured to be coupled to a second virtual network device sub-unit within the virtual network device, the first virtual network device sub-unit is coupled to the second virtual network device sub-unit via a virtual network device link, the first network device comprises a first plurality of ports, each of the first plurality of ports is configured to communicate packets with a respective client, the first network device is configured to append a header to the first packet before sending the first packet to the virtual network device via one of the first plurality of communication links, and the header identifies a one of the first plurality of ports having received the packet, the first plurality of communication links provides redundant connections between the first network device and the virtual network device; and means for sending a second packet via a second link of a second virtual link bundle if a second destination identifier associated with the second packet is associated with the second virtual link bundle, wherein the second virtual link bundle comprises a second plurality of communication links, the second plurality of communication links is configured to couple the virtual network device to a second network device external to the virtual network device, a first end of each of the second plurality of communication links is configured to be coupled to the second network device, a second end of a first one of the second plurality of communication links is configured to be coupled to the first virtual network device sub-unit within the virtual network device, a second end of a second one of the second plurality of communication links is configured to be coupled to the second virtual network device sub-unit within the virtual network device, the second network device comprises a second plurality of ports, the second plurality of communication links provides redundant connections between the second network device and the virtual network device, the first network device and the second network device operate in an access layer, the first network device and the second network device are satellite network devices which do not perform layer two forwarding or layer three routing, the first plurality of communication links and the second plurality of communication links are uplinks, the second virtual network device sub-unit is configured to disable transmission of the second packet via the virtual link bundle in response to determining that the second packet was received via the virtual network device link, detect a failure of all links of the virtual link bundle coupled to the second virtual network device sub-unit, and enable transmission of the second packet via the virtual link bundle in response to the failure.

27. The system of claim 26, further comprising:
means for selecting the first one of the first plurality of communication links comprised in the virtual link bundle, wherein
the selecting comprises performing a hash-based algorithm.

28. The system of claim 26, further comprising:
means for receiving a third packet, wherein
a destination identifier for the third packet identifies an interface bundle, and
the interface bundle comprises a first interface; and
means for detecting whether the third packet was received via the virtual network device link, wherein
a first end of the virtual network device link is coupled to a first virtual network device sub-unit,
a second end of the virtual network device link is coupled to a second virtual network device sub-unit;
means for filtering out the third packet from a packet flow being sent via the first interface if the third packet was received via the virtual network device link.

29. The system of claim 28, further comprising:
means for sending the third packet via the first interface if the third packet was not received via the virtual network device link.

30. The system of claim 29, further comprising:
means for maintaining consistency between a lookup table comprised in the first virtual network device sub-unit and a second lookup table comprised in the second virtual network device sub-unit.

31. The system of claim 29, further comprising
means for performing control protocol processing for the interface bundle at a primary controller comprised in the first virtual network device sub-unit, wherein
the first interface is comprised in the first virtual network device sub-unit.

32. The system of claim 31, further comprising:
means for managing a second interface of the second virtual network device sub-unit in response to information generated by the performing the control protocol processing, wherein
the second interface is comprised in the interface bundle.

33. The system of claim 32, further comprising:
means for looking up a destination address of the third packet in a lookup table, and
means for sending the third packet via the first interface of the first virtual network device sub-unit instead of sending the third packet via the second interface of the second virtual network device sub-unit if the lookup table returns the destination identifier.

34. The system of claim 28, further comprising:
means for learning that a source address of the third packet is behind a local interface, in response to receiving the third packet via the virtual network device link.

35. A computer readable medium comprising program instructions executable to:
send a first packet via a first link of a virtual link bundle if a destination identifier associated with the first packet is associated with the virtual link bundle, wherein
the virtual link bundle comprises a first plurality of communication links,
the first plurality of communication links is configured to couple a virtual network device to a first network device external to the virtual network device,
the first virtual network device operates in an access layer,
a first end of each of the first plurality of communication links is configured to be coupled to the first network device,
a second end of a first one of the first plurality of communication links is configured to be coupled to a first virtual network device sub-unit within the virtual network device,
a second end of a second one of the first plurality of communication links is configured to be coupled to a second virtual network device sub-unit within the virtual network device,
the first virtual network device sub-unit is coupled to the second virtual network device sub-unit via a virtual network device link,
the first network device comprises a first plurality of ports,
each of the first plurality of ports is configured to communicate packets with a respective client, the first network device is configured to append a header to the first packet before sending the first packet to the virtual network device via one of the first plurality of communication links, and the header identifies a one of the first plurality of ports having received the packet, the first plurality of communication links provides redundant connections between the first network device and the virtual network device; and send a second packet via a second link of a second virtual link bundle if a second destination identifier associated with the second packet is associated with the second virtual link bundle, wherein the second virtual link bundle comprises a second plurality of communication links, the second plurality of communication links is configured to couple the virtual network device to a second network device external to the virtual network device, a first end of each of the second plurality of communication links is configured to be coupled to the second network device, a second end of a first one of the second plurality of communication links is configured to be coupled to the first virtual network device sub-unit within the virtual network device, a second end of a second one of the second plurality of communication links is configured to be coupled to the second virtual network device sub-unit within the virtual network device, the second network device comprises a second plurality of ports, the second plurality of communication links provides redundant connections between the second network device and the virtual network device, the first network device and the second network device operate in an access layer, the first network device and the second network device are satellite network devices which do not perform layer two forwarding or layer three routing, the first plurality of communication links and the second plurality of communication links are uplinks, the second virtual network device sub-unit is configured to disable transmission of the packet via the virtual link bundle in response to determining that the packet was received via the virtual network device link, detect a failure of all links of the virtual link bundle coupled to the second virtual network device sub-unit, and enable transmission of the packet in response to the failure.

36. The computer readable medium of claim 35, wherein the program instructions are further executable to:
select the first one of the first plurality of communication links comprised in the virtual link bundle, wherein
selecting the first one of the first plurality of communication links comprises performing a hash-based algorithm.

37. The computer readable medium of claim 35, wherein the program instructions are further executable to:
detect reception of a third packet, wherein
a destination identifier for the third packet identifies an interface bundle, and
the interface bundle comprises a first interface; and
detect whether the third packet was received via the virtual network device link, wherein a first end of the virtual network device link is coupled to the first virtual network device sub-unit, a second end of the virtual network device link is coupled to the second virtual network device sub-unit;

filter out the third packet from a packet flow being sent via the first interface if the third packet was received via the virtual network device link.

38. The computer readable medium of claim 37, wherein the program instructions are further executable to:
send the third packet via the first interface if the third packet was not received via the virtual network device link.

39. The computer readable medium of claim 38, wherein the program instructions are further executable to:
maintain consistency between a lookup table comprised in the first virtual network device sub-unit and a second lookup table comprised in the second virtual network device sub-unit.

40. The computer readable medium of claim 38, wherein the program instructions are further executable to:
perform control protocol processing for the interface bundle at a primary controller comprised in the first virtual network device sub-unit, wherein
the first interface is comprised in the first virtual network device sub-unit.

41. The computer readable medium of claim 40, wherein the program instructions are further executable to:
manage a second interface of the second virtual network device sub-unit in response to information generated by performing the control protocol processing, wherein
the second interface is comprised in the interface bundle.

42. The computer readable medium of claim 41, wherein the program instructions are further executable to:
look up a destination address of the third packet in a lookup table, and
if the lookup table returns the destination identifier, send the third packet via the first interface of the first virtual network device sub-unit instead of sending the packet via the second interface of the second virtual network device sub-unit.

43. The computer readable medium of claim 37, wherein the program instructions are further executable to:
learn that a source address of the third packet is behind a local interface, in response to detecting reception of the third packet via the virtual network device link.

44. The system of claim 1, wherein
the second virtual network device sub-unit is configured to prevent unnecessary traffic over the virtual network device link, and
preventing unnecessary traffic comprises selecting a local interface of a plurality of interfaces associated with the virtual link bundle, wherein
the plurality of interfaces comprises the local interface and a remote interface,
the second virtual network device sub-unit comprises the local interface and the first virtual network device sub-unit comprises the remote interface, and
the selecting comprises generating a hash value for each interface of the plurality of interfaces.

45. The system of claim 1, wherein
the determining that the second packet was received via the virtual network device link comprises examining information in a header of the second packet, and
the information is added to the header by the first virtual network device sub-unit in response to forwarding the second packet via the virtual network device link.

* * * * *